(12) United States Patent
Ruer

(10) Patent No.: US 8,627,665 B2
(45) Date of Patent: Jan. 14, 2014

(54) INSTALLATION AND METHOD FOR STORING AND RETURNING ELECTRICAL ENERGY

(75) Inventor: Jacques Ruer, Le Pecq (FR)

(73) Assignee: Saipem S.A., Montigny le Bretonneux (FR)

(\*) Notice: Subject to any disclaimer, the term of this patent is extended or adjusted under 35 U.S.C. 154(b) by 1062 days.

(21) Appl. No.: 12/599,747

(22) PCT Filed: Apr. 21, 2008

(86) PCT No.: PCT/FR2008/050712
§ 371 (c)(1),
(2), (4) Date: Nov. 11, 2009

(87) PCT Pub. No.: WO2008/148962
PCT Pub. Date: Dec. 11, 2008

(65) Prior Publication Data
US 2010/0301614 A1 Dec. 2, 2010

(30) Foreign Application Priority Data
May 11, 2007 (FR) ...................................... 07 55010

(51) Int. Cl.
*F01K 1/02* (2006.01)
(52) U.S. Cl.
USPC .............................................. 60/659; 60/650
(58) Field of Classification Search
USPC ............................... 60/650, 659, 682; 165/10
See application file for complete search history.

(56) References Cited

U.S. PATENT DOCUMENTS

| 3,818,697 A | 6/1974 | Gilli |
| 4,094,148 A | 6/1978 | Nelson |
| 4,727,930 A * | 3/1988 | Bruckner et al. ............. 165/111 |

FOREIGN PATENT DOCUMENTS

| JP | 2004 138043 | 5/2004 |
| WO | WO 2005/108758 | 11/2005 |
| WO | WO 2006/072185 | 7/2006 |

OTHER PUBLICATIONS

International Search Report and Written Opinion, dated Mar. 18, 2008.
English translation of the Written Opinion of the International Searching Authority.

\* cited by examiner

*Primary Examiner* — Kenneth Bomberg
*Assistant Examiner* — Jonathan Matthias
(74) *Attorney, Agent, or Firm* — Cozen O'Connor

(57) ABSTRACT

An installation for storing and returning electrical energy having first and second enclosures containing a gas and porous refractory materials suitable for transferring heat by contact between said porous refractory materials and a gas flowing through said enclosures, and a compressor and an expander for the gas flowing in pipes between each of the ends of an enclosure connected to an end of the other enclosure. Methods are also disclosed for storing electrical energy in the form of heat energy in which an installation of the invention is used, and for a method of returning electrical energy from heat energy stored by a method according to the invention. The electrical energy is stored in the form of heat within masses of refractory material, and the stored thermal potential energy is returned in the form of electrical energy.

29 Claims, 7 Drawing Sheets

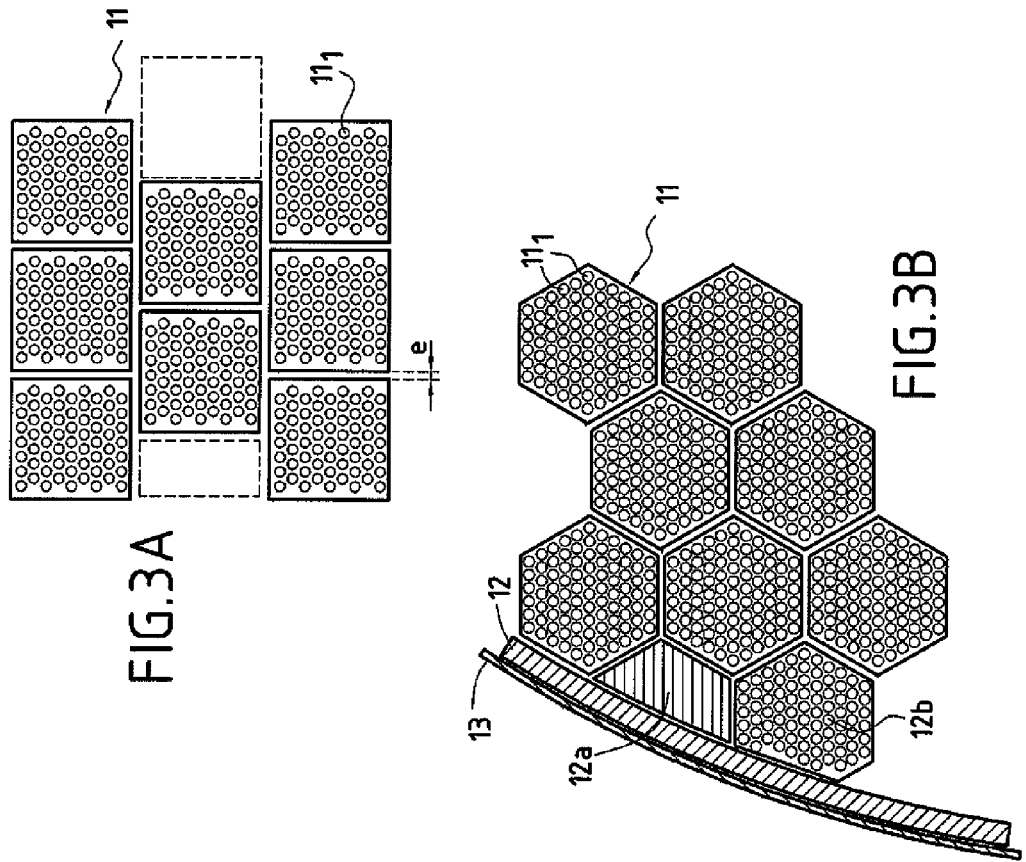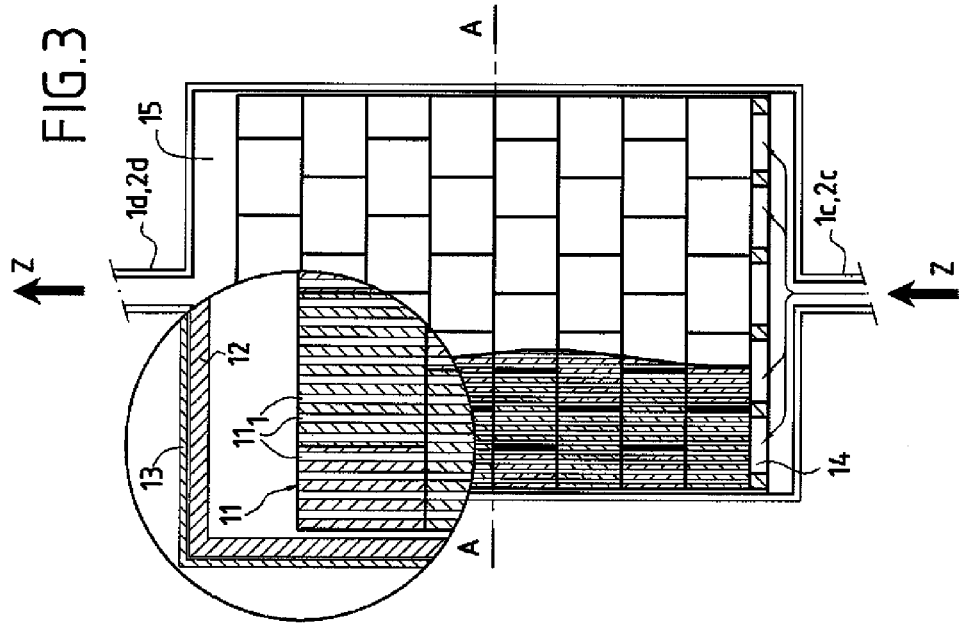

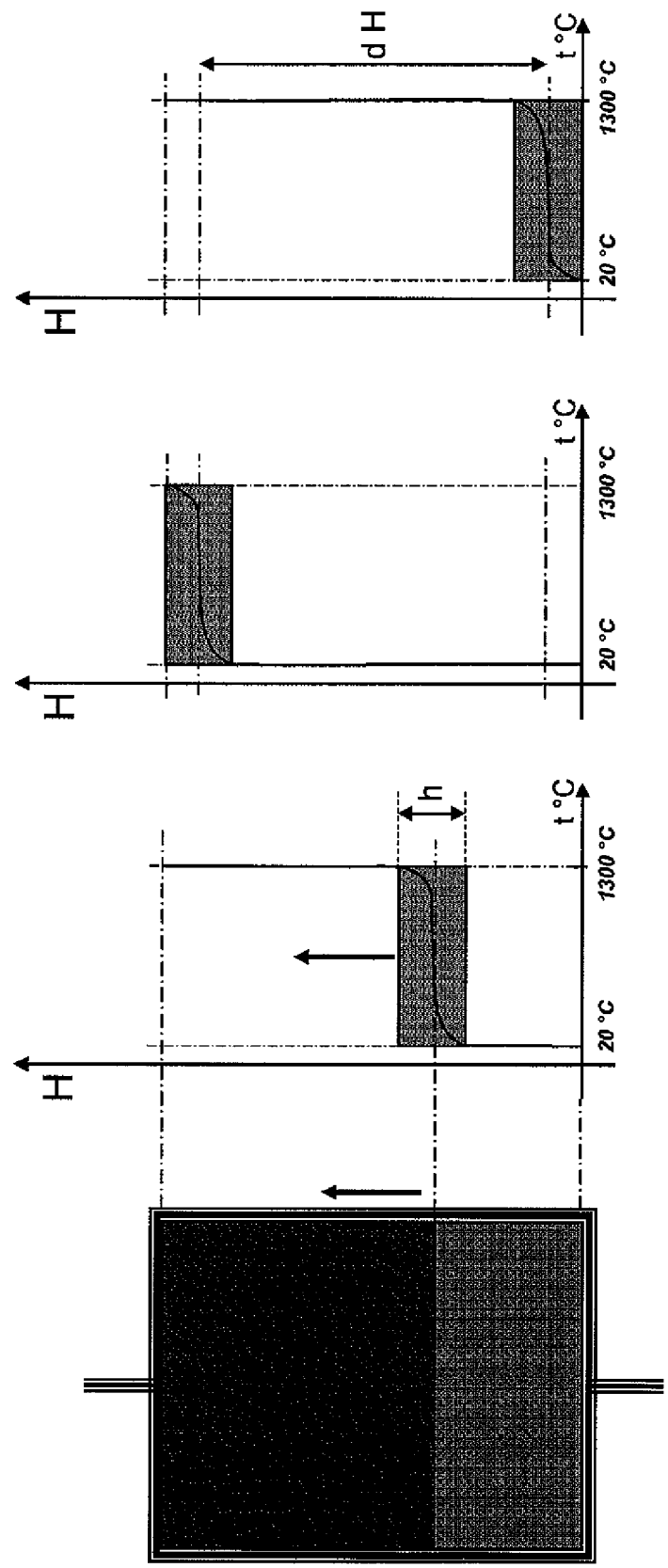

INSTALLATION AND METHOD FOR STORING AND RETURNING ELECTRICAL ENERGY

PRIORITY CLAIM

This is a U.S. national stage of application No. PCT/FR2008/050712, filed on Apr. 21, 2008. Priority is claimed on the following application: France Application No.: 0755010, Filed on May 11, 2007, the content of which is incorporated here by reference.

FIELD OF THE INVENTION

The present invention relates to an installation for storing and returning electrical energy that is suitable for storing several tens, or even several thousands of megawatt hours (MWh), and it also relates to methods of storing electrical energy in the form of heat energy in which use is made of an installation of the invention, and a method of returning electrical energy from heat energy stored by a method of the invention.

The present invention relates to storing energy at high temperature and more particularly to storing electrical energy in order to return it over the electricity network during peaks of consumption.

BACKGROUND OF THE INVENTION

Electricity is generally produced by power stations using a variety of fuels for producing the energy, such as gas, oil, coal, or lignite. Another means consists in using nuclear fuel to produce the heat that is then transformed into electrical energy in high pressure steam turbines.

Renewable energies are also known that contribute to a greatly varying extent to the production of electricity in various countries. Mention can be made, amongst other possibilities of: hydraulic energy from dams, wind turbines, water turbines that take energy from sea currents, and various devices that recover energy from the swell of the sea, or indeed from solar energy.

Although installations that produce electricity from fuel or from water retained by dams can operate continuously at nominal or maximum power during very long periods, renewable energies are characterized by operation that is intermittent, and incorporating renewable energy in a network generally serves to off-load only a fraction of conventional power stations, some of which can then be run at low power or even merely stopped, while waiting for a power demand from the network.

Various techniques are known that use turbines to produce mechanical energy from fuels, such as gas or oil, which consist in compressing an oxidizer, generally air, then mixing it with a fuel and causing it to burn in a combustion chamber, and finally directing it towards an expansion turbine in order to recover the mechanical energy that is produced, the compressor and the expansion turbine generally being mounted in line on a common shaft. In that type of rotary machine, maximum efficiency is sought, where maximum efficiency is a function of the inlet temperature to the expansion turbine. The limits on operating temperature are due to the temperature behavior of the blades in the expansion turbine, given the very aggressive nature of combustion gas at very high temperature, combustion gas generally being made up of $CO_2$, of NOx, and of other compounds that are aggressive for the alloys used for making the blades of the turbine.

Steam turbines are also known that are used in nuclear power stations for converting the energy of water that has been taken to very high temperature in the form of steam, firstly into mechanical energy, and then into electrical energy within generators that are coupled to the end of the steam turbine shaft. Such steam turbines operate in a closed circuit for the heat-conveying fluid, water in the steam phase upstream from the turbine and liquid water downstream from said turbine.

Attempts have been made for a long time to store energy so as to have energy available almost instantaneously during consumption peaks. Numerous techniques have been developed, and mention can be made, amongst others, of electrical storage batteries, generally lead-acid batteries, or pumping water up to a dam at altitude, for the purpose of driving turbines during peaks in energy demand.

Storing energy in lead-acid batteries is a valid technique for small and medium capacities, but when it is necessary to store the equivalent of a nuclear power station unit, i.e. about 1200 megawatts (MW) over periods of 24 hours (h) or 36 h, the installations required become gigantic and completely unrealistic.

Although dams constitute an excellent means for storing energy, suitable sites are unfortunately limited in number, and in addition storing very large quantities of energy requires enormous quantities of water to be mobilized, which quantities then need to be taken from the quantities that are available, and subsequently they need to be released during periods when there is no need for such quantities of water, e.g. for irrigation, in which case the water is then more or less wasted. Nevertheless, several sites comprise a high reservoir and a low reservoir, generally large-capacity lakes, and when storing energy, the content of the low lake is pumped up to the high lake, to be available for driving a turbine in the opposite direction when consumption peaks require additional power to be delivered to the electricity network.

Another technique consists in storing energy in the form of compressed air, and then retransforming it into mechanical energy by piston engines, vane motors, or indeed turbines.

Patent WO 2005/108758 describes a technique of storing energy in the form of heat in an underground enclosure, the heat being generated by compressing air that is initially at atmospheric pressure and at ambient temperature, with the temperature within the underground storage being about 700° C. In that application, the gas, i.e. air, flows in an open circuit from the free atmosphere into the cavern during the storage stage, and then from the cavern to the free atmosphere during the energy return stage.

In another technical field, regenerators are commonly employed in industries that use fire, i.e. with blast furnaces, in the ceramics and terra cotta industries, in the glass-making and cement-making industries, which regenerators consist in sending hot burnt gas into large towers to heat refractory masses contained therein so as to recover the heat from the gas, before releasing said gas into the atmosphere. When the maximum temperature is reached within the refractory materials, the flow of hot gas is stopped and a reverse flow of cool air is passed through, which air becomes heated on making contact with the refractory materials prior to being directed to the inlets of furnaces, or to burners. Those arrangements enable heat losses within industrial processes that consume large amounts of energy to be reduced very significantly.

The problem posed is to store electrical energy from conventional power stations, such as coal, gas, oil, or indeed nuclear power stations, in order to be able to return the energy very quickly in large quantities to the electricity network during peak periods when energy demand exceeds production capacity.

Likewise, with renewable energies, such as wind turbines or sea water turbines, the problem is to be able to store large quantities of energy during periods of strong wind or current, said energy corresponding to surplus production, in order to return said energy during a stage in which production is insufficient, i.e. when the wind or the current does not enable the energy production level to be maintained at a minimum threshold.

SUMMARY OF THE INVENTION

To do this, the present invention consists essentially in storing considerable quantities of electrical energy in the form of heat within masses of refractory materials, the fluid that enables energy to be transferred being a gas, preferably an inert gas such as argon, and then to return said stored thermal potential energy in the form of electrical energy.

More precisely, the present invention provides an installation for storing and returning electrical energy, the installation being characterized in that it comprises:

first and second enclosures containing a gas and first and second porous refractory materials suitable for transferring heat by contact between said porous refractory materials and a gas flowing through said enclosures; and a closed circuit of pipes enabling a gas to pass successively through each of the two enclosures from one end to the other; and compressor means and expander means for compressing and expanding the gas flowing in said pipes between each of the ends of an enclosure connected to an end of the other enclosure; and preferably, first gas heater means suitable for heating the gas flowing in said second enclosure; and also preferably, cooler means for cooling the gas flowing between one of the ends of the first enclosure and said compressor means and expander means, suitable for cooling the gas leaving said first enclosure at said end prior to being expanded in said expander means, or respectively the gas entering into said first enclosure after being compressed by said compressor means.

It will be understood that the two said $n^{th}$ top (or bottom) pipes may either be two parallel pipes providing a junction between said turbine/compressor and a single enclosure or one of the two includes a branch pipe from the other ahead of said turbine/compressor.

More particularly, according to the invention, an installation for storing and returning electrical energy comprises:

A) a first lagged enclosure filled with a first porous refractory material suitable for passing a gas flowing through said first enclosure between top and bottom ends of said first enclosure; and B) a second lagged enclosure filled with a second porous refractory material suitable for passing a gas flowing through said second enclosure between top and bottom ends of said second enclosure; and C) lagged pipes enabling the gas to flow in a closed circuit between the two enclosures, the pipes comprising first and second top pipes between the top ends of the two enclosures, and first and second bottom pipes between the bottom ends of the two enclosures; and D) preferably, first gas heater means suitable for heating a gas inside said second enclosure; and E) first gas compressor means comprising an electric motor suitable for being fed with electrical energy for storing to actuate a first compressor suitable for compressing a gas coming from said top end of the second enclosure via a said second top pipe to deliver it to said top end of the first enclosure via a said first top pipe; and F) first gas expander means comprising a first turbine suitable for expanding the gas coming from said bottom end of the first enclosure via a first bottom pipe to deliver it to said bottom end of the second enclosure via second bottom pipe; and G) second gas compressor means suitable for compressing the gas coming from said bottom end of the second enclosure via another second bottom pipe to deliver it to said bottom end of the first enclosure via another first bottom pipe; and H) second gas expander means comprising a second turbine suitable for expanding the gas coming from said top end of the first enclosure via another first top pipe to deliver it to said top end of the second enclosure via another second top pipe, said second expander means being suitable for actuating an electricity generator suitable for returning the electrical energy; and I) gas cooler means, preferably a heat exchanger suitable for cooling the gas flowing in said first bottom pipe between firstly the bottom end of the first enclosure and secondly the outlet and inlet of said second compressor and said first turbine, respectively.

Preferably, the electrical energy storage and return installation of the invention includes second gas heater means suitable for heating the gas flowing in a said second top pipe between the top end of said second enclosure and said first compressor.

According to other advantageous characteristics of the installation of the invention:

said first turbine is suitable for being actuated by said first compressor to which it is mechanically coupled;

said second turbine is coupled to an auxiliary electric motor suitable for driving it; and said second compressor is actuated by said second turbine to which it is mechanically coupled.

In a preferred embodiment, the installation of the invention is filled with an inert gas, preferably argon.

As explained below, argon gas is advantageous since it is a gas that is permanent and inert, i.e. it does not corrode the pipework, and it is a monatomic gas that presents the advantage of heating easily, and thus a limited compression ratio, and it is of low cost given its abundance.

In particular embodiments, the installation presents the characteristics whereby:

said first enclosure and the first porous refractory material are capable of withstanding a temperature $T1$ of at least 750° C., preferably lying in the range 750° C. to 2000° C., more preferably 1000° C. to 1500° C.;

said second turbine is dimensioned to expand a gas at said temperature $T1$, while said first turbine, of smaller capacity than the second turbine, is dimensioned to expand the gas from ambient temperature $T0$ to a temperature $T3$ in the range −80° C. to −20° C.;

said second enclosure and second porous refractory material are capable of withstanding a temperature $T2$ of at least 400° C., preferably lying in the range 400° C. to 1000° C., more preferably 500° C. to 700° C.; and said first compressor is dimensioned to compress a gas at said temperature $T2$, while said second compressor, of smaller capacity than the first compressor, is dimensioned to compress the gas at a temperature $T3$ in the range −80° C. to −20° C. to ambient temperature.

Still more particularly, said first compressor is suitable for delivering at a volume flow rate greater than said first turbine, and said second turbine is suitable for delivering a volume flow rate greater than said second compressor, and said first compressor and second turbine are made of carbon.

Preferably, said refractory materials present an intrinsic heat capacity per unit volume of at least 2000 kilojoules per cubic meter per kelvin (kJ.m$^{-3}$.K$^{-1}$), and more preferably at least 2800 kJ.m$^{-3}$.K$^{-1}$.

Advantageously, said first and second porous refractory materials present porosities lying in the range 20% to 60%.

More particularly, said first and second porous refractory materials are constituted by porous bricks assembled one against another, preferably having cylindrical perforations passing therethrough that are disposed parallel in a common longitudinal direction that is the longitudinal direction of the enclosure in which they are assembled, said perforations more preferably being of a diameter in the range 5 millimeters (mm) to 20 mm.

In particular embodiments, said first and second porous refractory materials are constituted by fire clay having high contents of compounds selected from magnesia, alumina, and lime.

Refractory materials that may be mentioned are chamotte, magnesia, dolomite, mullite, and also carbon.

More particularly, said first porous refractory material is constituted by second-firing fire clay or chamotte, and said second porous refractory material is constituted by first firing fire clay.

In a particular embodiment, said first and second enclosures have respective volumes of not less than 5000 cubic meters (m$^3$), and preferably lying in the range 10,000 m$^3$ to 45,000 m$^3$.

The present invention also provides a method of storing electrical energy in the form of heat energy, in which an installation of the invention is used, the method being characterized in that, after an initial step of preheating the gas of said second enclosure that is heated to a temperature $T_2$, said installation being filled with a permanent gas that is initially at ambient temperature $T_0$, the following successive steps are performed:

1) the gas leaving the top end of the second enclosure at a temperature $T_2$ is heated to a temperature $T_1$ higher than a temperature $T_2$ by being compressed in a said first compressor before being delivered to the top end of said first enclosure, in which a pressure P1 is established higher than the pressure P2 of the second enclosure, said first compressor being driven by a first electric motor powered by the electrical energy that is to be stored; and 2) the gas passes right through said first enclosure between said top end and its said bottom end, and it leaves said bottom end of the first enclosure at an ambient temperature T0 or a temperature T'1 greater than T0 but less than T2; and 3) the gas is then cooled, where appropriate, to an ambient temperature T0 by said gas cooler means, preferably of the heat exchanger type, located downstream from the outlet of the bottom end of the first enclosure; and 4) the gas is then expanded through a said first turbine, preferably driven by said first compressor, to said pressure P2 of the second enclosure that is lower than the pressure P1, the gas thus being cooled to a temperature T3 lower than T0 prior to entering into said second enclosure via its bottom end; and 5) the gas is caused to flow through said second enclosure between said bottom and top ends of the second enclosure, thereby having the effect of increasing the volume of the refractory material in the bottom portion of said second enclosure that is cooled to the temperature T3, and of decreasing the volume of its top portion that is at the temperature T2 or T'2 lower than T2 but greater than T0 and T'1, and if necessary, where appropriate, the gas leaving the second enclosure at the temperature T'2 is heated to the temperature T2 with the help of second gas heater means; and 6) above steps 1) to 5) are repeated until the top portion of the first enclosure heated to the temperature T1 occupies at least 80% of the volume of said first enclosure, and the bottom portion of the second enclosure cools to a temperature T3 occupying at least 80% of the volume of the second enclosure.

It will be understood that at each step 2) when the gas reaches the temperature T1 at the top end of the first enclosure, which is initially entirely at the temperature T0, and the gas moves down from the top end towards the bottom end of the first enclosure, the gas passing through said first porous refractory material has the effect of the gas delivering heat to said first refractory material in the top portion of the first enclosure, which then becomes heated to the temperature T1, while its bottom portion that is not heated or that is heated to a smaller extent is at a temperature T'1 lying in the range T0 to T1, and in practice in the range T0 to T2. As the gas that circulates in a closed loop continues to pass through, the front, or rather the thermal transition layer, between the hot top portion and the cold bottom portion in the first enclosure moves downwards, and the top portion at the temperature T1 occupies an ever increasing volume. In parallel, in step 5), the gas penetrates into the bottom of the second enclosure at a cold temperature T3, thereby having the effect of extracting heat from said second porous refractory material and thus cooling the bottom portion of the second enclosure which passes from the temperature T2 to the temperature T3. As the gas continues to pass, the front, or rather the thermal transition layer, between the hot top portion and the cold bottom portion of the second enclosure progresses upwards and the bottom portion at the temperature T3 occupies an ever increasing volume.

The electrical energy E1 used to feed the first compressor with energy is thus stored in the form of (hot) thermal energy (calories) in the first enclosure and in the form of (cold) thermal energy (frigories) in the second enclosure, with this energy depending on the gradient T1-T3.

Preferably, storage is interrupted so that the bottom portion of the first enclosure at said temperature T'1 represents at least 10% of the volume of the first enclosure, preferably 10% to 20% of the volume of the first enclosure, and/or the top portion of the second enclosure at the temperature T2 represents less than 20%, preferably 10% to 20% of the volume of said second enclosure.

According to other particular characteristics of the present invention that are advantageous, said refractory materials used have the following properties and masses:

said temperatures T1 and T2 are such that T1/T1=1.5 to 3 and T1/T0 is greater than 2, preferably greater than 3, and more preferably less than 6, and P1/P2 lies in the range 2 to 4; and T1 is 750° C. to 2000° C., preferably 1000° C. to 1500° C., and T2 is 400° C. to 1000° C., preferably 500° C. to 700° C.; and the pressure P1 lies in the range 2 to 4 bars absolute (2×10$^5$ Pa to 4×10$^5$ Pa), and the pressure P2 lies in the range 0.5 to 1.5 bars absolute (0.5×10$^5$ Pa to 1.5×10$^5$ Pa); and T0 lies in the range 10° C. to 50° C. and T3 lies in the range −80° C. to −20° C., T1' lying in the range 20° C. to 150° C., where appropriate. Advantageously, a quantity of electrical energy is stored which lies in the range 20 MWh to 10,000 MWh.

The present invention also provides a method of returning electrical energy from heat energy stored by a method of the invention as defined above, the method being characterized in that, after an initial starting stage in which said second compressor and said second turbine are driven by the said auxiliary electric motor, during which initial stage a pressure gradient is established between the pressure P'1 in the first enclosure and a pressure P'2 less P'1 in the second enclosure, such that P'1 is greater than P'2, P'1 preferably being greater than P1 and P'2 preferably being less than P2, the following successive steps are performed:

1) the gas leaving via the top end of the first enclosure at said temperature T1 is expanded and cooled to the temperature T2 through the second turbine, and said second turbine actuates a said electricity generator enabling returned electrical energy to be delivered; and 2) the gas passes through said second enclosure from its top end to its bottom end, a top portion of the second enclosure being heated to said temperature T2, a bottom portion of the second enclosure remaining at said temperature T3; and 3) the gas leaving the bottom end of said second enclosure at the temperature T3 is then compressed by passing through said second compressor that is preferably actuated by the energy released by the second turbine so as to be heated to a temperature T4 greater than an ambient temperature T0 and where appropriate greater than T'1, but less than T2, at the outlet from said second compressor; and 4) preferably, the gas is then cooled to the ambient temperature T0 or T'1 by said cooler means prior to being introduced into said first enclosure by its bottom end (12) to enter the bottom portion of said first enclosure which is at said temperature T'1; and 5) the gas is caused to flow through said first enclosure, thereby having the effect of increasing the volume of refractory material in the bottom portion that is at said temperature T'1 and of decreasing the volume of refractory material in the top portion that is at said hot temperature T1; and 6) above steps 1) to 5) are repeated until the bottom portion of the first enclosure at said temperature T1 represents at least 80% of the volume of the first enclosure, and the top portion of said second enclosure at said temperature T2 represents at least 80% of the volume of said second enclosure.

It will be understood that in order to maintain in the enclosures the same temperatures T1 and T2 as in the energy storage method of the invention, it is necessary, in the initial step, to establish a pressure gradient between the two enclosures that is greater than the pressure gradient between the enclosures during the storage method of the invention.

It will be understood that at each step 2), when the gas reaches the temperature T2 at the top end of the second enclosure, which is initially not more than 20% at the temperature T2 or T'2 less than T2, and the gas moves down from the top end towards the bottom end of the second enclosure, the passage of the gas through said second porous refractory material has the effect of the gas delivering heat to said second refractory material in the top portion of the second enclosure, which thus becomes heated to the temperature T2, while its non-heated bottom portion remains at the temperature T3. As the gas continues to pass through, the front, or rather the thermal transition layer, between the hot top portion and the cold bottom portion of the second enclosure moves downwards and the bottom portion at the temperature T3 occupies an ever decreasing volume. In parallel, in step 5), the gas arrives at ambient temperature T0 or at a temperature T'1 in the bottom of the first enclosure, thereby cooling said first porous refractory material and thus cooling the bottom portion of the first enclosure which goes from the temperature T1 to the temperature T'1. As the gas continues to pass through, the front, or rather the thermal transition layer, between the hot top portion and the cold bottom portion of the first enclosure moves upwards and the top portion at the temperature T1 occupies an ever decreasing volume.

The electrical energy $E_1$ stored in the form of (hot) thermal energy (calories) in the first enclosure and (cold) thermal energy (frigories) in the second enclosure is thus converted into electrical energy $E_R$ from the mechanical energy released by said second turbine used during expansion and cooling of the gas from the first enclosure.

Preferably, in step 6), the energy return method is interrupted so as to maintain a top portion of the first enclosure at a said temperature T1, said top portion representing less than 20%, preferably 10% to 20% of the volume of said first enclosure, and/or a bottom portion of the second enclosure at said cold temperature T3 represents less than 20%, preferably 10% to 20%, of the volume of the second enclosure.

Advantageously, the efficiency $E_R/E_1$ with which electrical energy is returned by said electricity generator is greater than 60%, and preferably lies in the range 75% to 85%.

According to other characteristics that are advantageous of the method of returning electrical energy of the invention:
the ratio P'1/P'2 lies in the range 3 to 5; and
T4 lies in the range 150° C. to 400° C.; and
the pressure P'1 lies in the range 3 to 5 bars absolute ($2\times10^5$ Pa to $4\times10^5$ Pa) and P'2 lies in the range 1 to 1.5 bars absolute ($1\times10^5$ Pa to $1.5\times10^5$ Pa).

BRIEF DESCRIPTION OF THE DRAWINGS

Other advantages and characteristics of the present invention appear in the light of the following detailed description given with reference to the following figures, in which:

FIG. 3 is a section and side view of an enclosure of an installation of the invention, including an enlargement showing cylindrical perforations;

FIGS. 3A and 3B are section views on a horizontal plane showing two variant arrangements for refractory material elements that are respectively square and hexagonal in shape;

FIGS. 7, 7A, and 7B show how a thermal transition layer of height h advances within a said first enclosure (FIG. 7) between the top and bottom ends (FIGS. 7A and 7B respectively).

DETAILED DESCRIPTION OF THE PRESENTLY PREFERRED EMBODIMENTS

Figure 1:
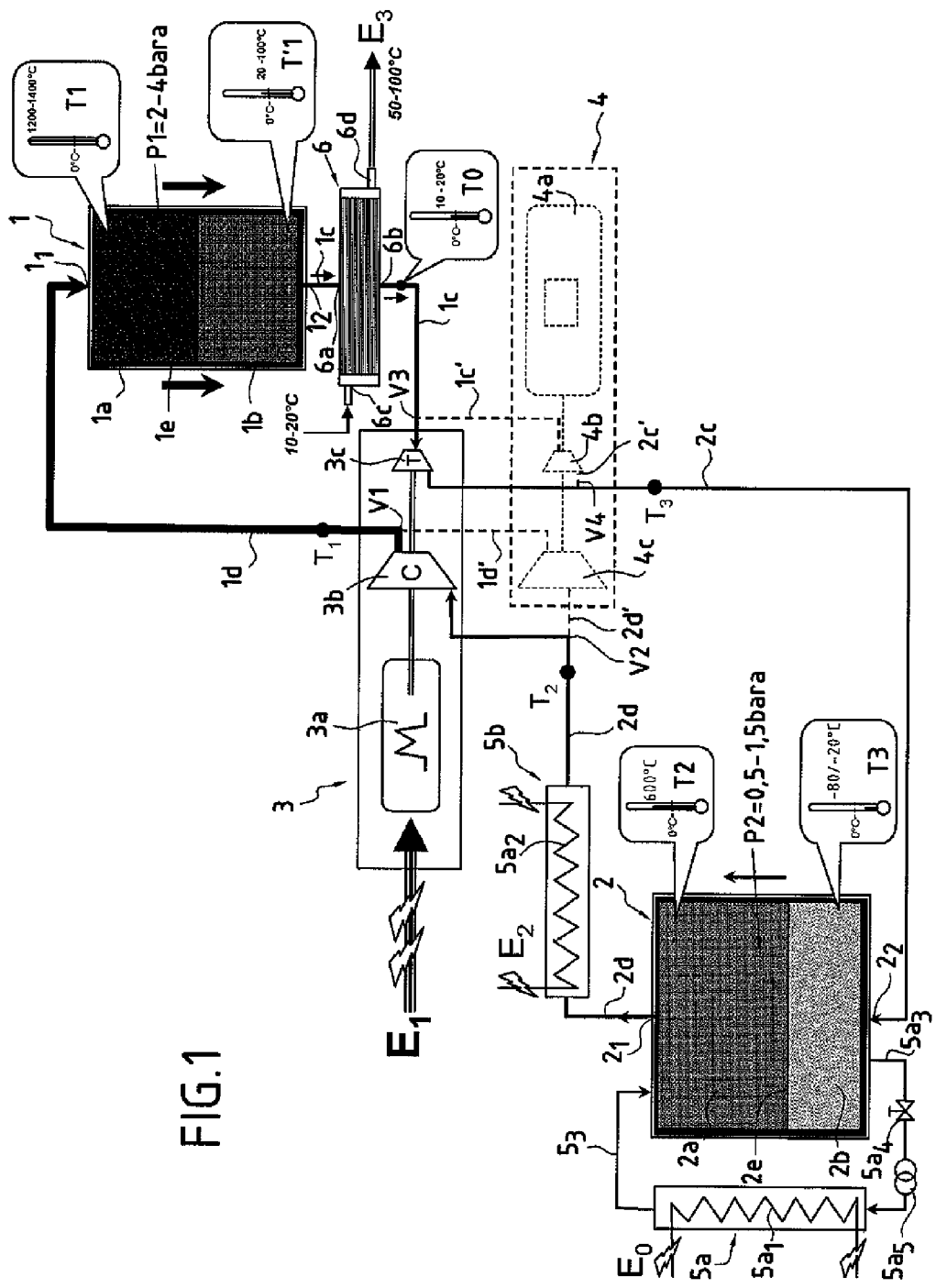
FIG. 1 is a functional diagram of an installation of the invention in an energy storage method of the invention, i.e. in a stage of recharging the first enclosure or hot source.

The device of the invention for storing electrical energy and for returning electrical energy comprises:
a first lagged enclosure 1 comprising a steel wall that is 10 mm to 100 mm thick and that is filled with a first porous refractory material capable of withstanding high temperatures and pressures of an inert gas contained therein, at a temperature T1 lying in the range 1000° C. to 1600° C., and more particularly of 1300° C., and at a pressure P1 lying in the range 2 bars absolute (bara) to 5 bara (i.e. lying in the range $2\times10^5$ pascals (Pa) to $5\times10^5$ Pa); and a second lagged enclosure 2 having the same volume, e.g. lying in the range 10,000 m³ to 15,000 m³, having a steel wall of thickness lying in the range 10 mm to 100 mm and filled with a second porous refractory material capable of withstanding the temperature T2 and the pressure P2 of the inert gas it contains, i.e. T2 lying in the range 500° C. to 700° C., and more particularly being about 600° C.

Said first and second enclosures 1 and 2 are substantially entirely filled with a porous refractory material 11 having high calorific volume as described above.

The device includes ducts for closed-circuit circulation between said first and second enclosures 1 and 2 so as to enable the gas contained in the installation to pass through each of the enclosures between two opposite ends $1_1$-$1_2$ and $2_2$-$2_2$ thereof that are preferably situated respectively at the top and bottom ends of said enclosures.

The circulation ducts between the first and second enclosures also include means for compressing/expanding the gas between the two enclosures, as explained below.

More particularly, said first and second enclosures are disposed vertically.

Figure 2:
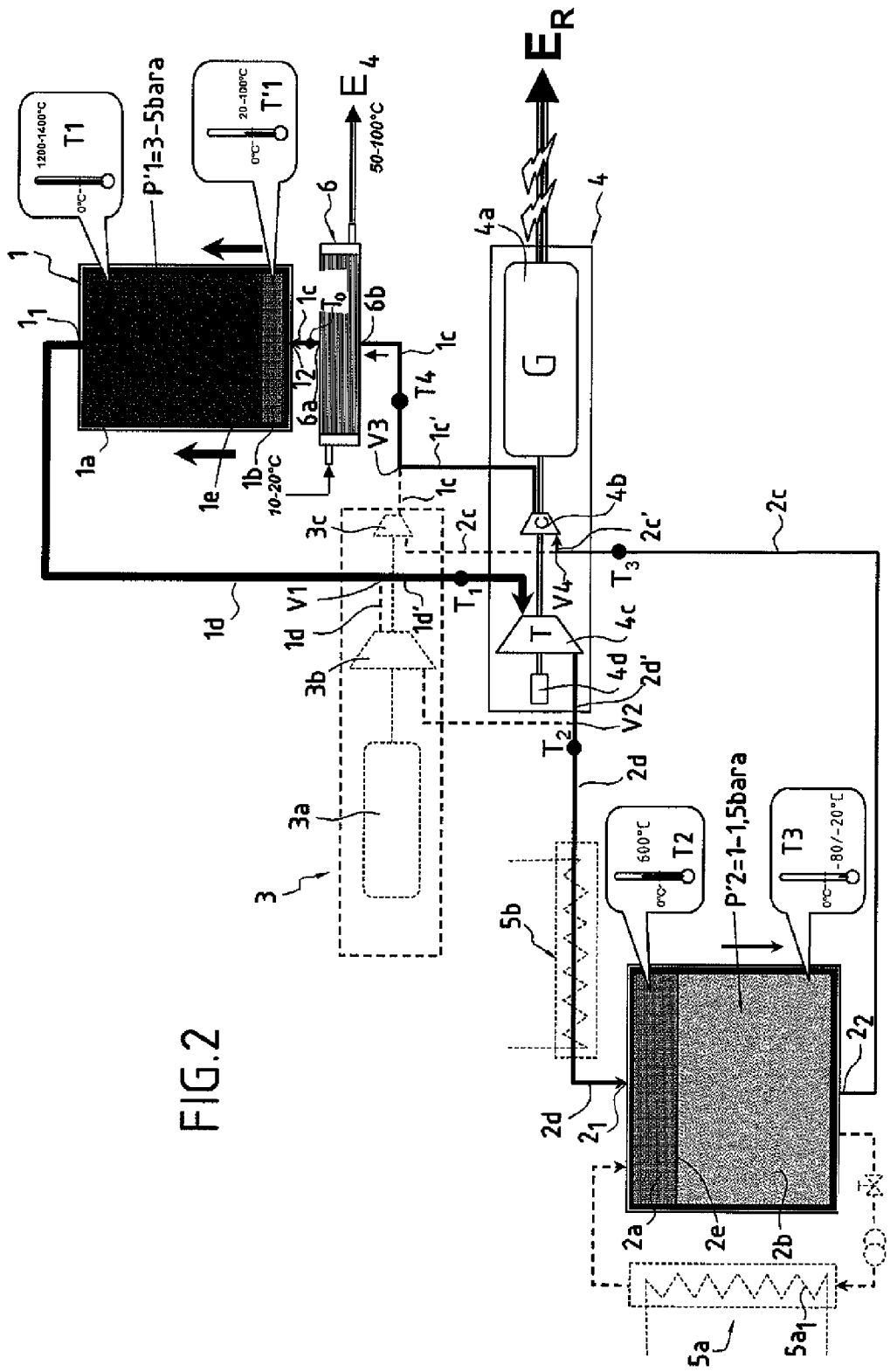
FIG. 2 is a functional diagram of the installation of the invention while returning in the form of electricity the thermal energy stored in the first enclosure or hot source.

In FIGS. 1 and 2, the first enclosure 1 has a top duct 1d at its top end $1_1$, opening out into the top portion 1a of the first enclosure, and at its bottom end $1_2$ it has a first bottom duct 1c opening out into the bottom portion 1b of the first enclosure 1.

Similarly, the second enclosure 2 has a second top duct 2d at its top end $2_1$ opening out into the top portion 2a of the second enclosure 2, and a second bottom duct 2c at its bottom end $2_2$ opening out into the bottom portion 2b of the second enclosure 2.

Said first and second bottom ducts 1c, 2c and top ducts 1d, 2d are likewise lagged.

Said second enclosure 2 is coupled to a first heater 5a, preferably a heater comprising an electrical resistance $5a_1$ and a closed circuit of heater piping $5a_3$ between two ends of the second enclosure, the gas flowing in the heater piping $5a_3$ being heated by said first heater 5a.

A first compression/expansion group 3 is interposed between said first and second enclosures 1 and 2. This first compression/expansion group 3 comprises an electric motor 3a powered by electricity $E_1$ and serving to actuate a first dynamic compressor 3d of the axial or centrifugal type, and a first gas turbine 3c, itself coupled to said first compressor 3b, their respective shafts being coupled to one another, as explained below.

Said first compressor 3b is connected at its outlet to the top end $1_1$ of the first enclosure 1 via said first top pipe 1d, and said first compressor 3b is connected at its inlet to the top end $2_1$ of said second enclosure 2 via said second top pipe 2d. Said second top pipe 2d constitutes the feed pipe of the first compressor 3b and said first top pipe 1d constitutes the gas exhaust pipe from the first compressor 3b after compression during a storage cycle, as explained below.

A second heater 5b, preferably comprising a second electrical resistance $5a_2$, co-operates with said second top pipe 2d, said second heater 5b being interposed between the top end $2_1$ of the second enclosure 2 and the inlet of the first compressor 3b.

Said first turbine 3c is connected to the top end $1_2$ of said first enclosure 1 via said first bottom pipe 1c, and said first turbine 3c is connected to the bottom end $2_2$ of said second enclosure 2 via said second bottom pipe 2c. Said first bottom pipe 1c serves to feed said first turbine 3c with gas exhausted from the bottom portion 1b of the first enclosure 1, and the gas exhausted from said first turbine 3c reaches the bottom portion 2b of said second enclosure 2 via said second bottom pipe 2c, when the device is operating in a storage cycle, as explained below.

A heat exchanger 6 co-operates with said first bottom pipe 1c between the bottom end $1_2$ of said first enclosure 1 and said first turbine 3c.

As shown in FIG. 2, a second group 4, referred to as an electricity generator group, is interposed between said first enclosure 1 and said second enclosure 2 as follows. Said electricity generator second group 4 comprises a second electric motor 4d coupled to a second gas turbine 4c and to a second compressor 4b. The second electric motor 4d is a small motor serving essentially to start the second turbine 4c when starting the energy return/withdrawal cycle, as explained below.

The electricity generator second group 4 includes an alternator 4a coupled to the outlet shaft of said second gas turbine 4c and of said second compressor 4b, so as to return electrical energy $E_R$ when said second turbine 4c and said compressor 4b are activated, as explained below, during an energy withdrawal cycle.

Said second turbine 4c is fed with gas by a duct 1d' constituting a branch connection from said first top duct 1d (also referred to as the first top branch duct 1d'), or a duct parallel to said first top duct, providing the connection between the top end $1_1$ of the first enclosure 1 and the second turbine 4c. When the device is operating in a withdrawal cycle, the expanded gas leaving said second turbine 4c is exhausted towards the top end $2_1$ of the second enclosure 2 via a branch duct 2d' on the second top duct 2d (also referred to as the second top branch duct 2d') or via a duct parallel with said second top duct, thus providing the connection between the top end $2_1$ of the second enclosure and the second turbine 4c.

Said second compressor 4b is fed with gas by a branch duct 2c' on said second bottom duct 2c (also referred to as the second branch bottom duct 2c') or a pipe parallel thereto thus providing a connection between the bottom end $2_2$ of the second enclosure and the second compressor 4b. The gas is exhausted from said second compressor 4b towards the bottom end $1_2$ of said first enclosure 1 via a branch duct 1c' on said first bottom duct 1c (also referred to as the first branch bottom duct 1c') or a duct parallel to the first bottom duct 1c, providing the connection between the bottom end $1_2$ and said second compressor 4b.

The second branch bottom duct 2c' provides the connection between the second compressor 4b and the second bottom pipe 2c before it reaches said first turbine 3c. The first branch top duct 1d' provides a connection between the second turbine 4c and the first top duct 1d before it reaches said first compressor 3b. The second branch top duct 2d' provides a junction between the second turbine 4c and the second top duct 2d between said second heater 5b and said first compressor 3b. The first branch bottom duct 1c' provides a connection between the second compressor 4b and the first bottom duct 1c between said heat exchange 6 and first turbine 3c.

The enclosures 1 and 2 are filled with a porous refractory material 11 enabling the gas to flow right through said enclosures between their top ends $1_1$-$1_2$ and bottom ends $1_2$-$2_2$. The porous refractory materials used in the first and second enclosures may present porosity (void percentage) lying in the range 20% to 60%, thus constituting a good compromise between firstly sufficient heat exchange between the gas and the refractory materials, and secondly head loss that is sufficiently low, while conserving a speed of flow that is sufficiently high through said porous material. In operation, the device of the invention is completely filled with an inert gas, preferably argon, i.e. the above-mentioned pipe circuits, turbines, compressors, heaters, and said first and second enclosures are all filled with inert gas.

FIG. 3 is a section and side view of an enclosure comprising a gasproof metal outer casing 13 and an internal lagging system 12 disposed between the wall of the metal outer casing 13 and a stack of blocks or bricks of refractory material 11 presenting vertical channels $11_1$ in the form of perforations, preferably of circular section with a diameter lying in the range 5 mm to 30 mm, passing right through them and arranged in substantially uniform manner in each plane over the entire horizontal section of said first enclosure, as shown in detail in FIGS. 3A and 3B.

The channels $11_1$ in the various superposed blocks 11 are in alignment with one another so as to allow the gas to circulate in the longitudinal direction ZZ of the enclosure 1, 2 between the two opposite ends of the enclosure without obstacle between the channels in the various blocks that are superposed on one another in the same longitudinal direction ZZ. A highly perforated support structure 14 situated in the bottom portion of said enclosure enables the gas entering or exiting via the adjacent lagged bottom ducts 1c, 2c to be spread in substantially uniform manner over the entire section of said enclosure, thereby directing the gas in optimum manner, i.e. with minimum head losses, to the channels $11_1$ passing vertically through said blocks of refractory material 11 when feeding takes place from the bottom. Similarly, empty spaces 15 are provided in the top portions of the enclosures so as to enable the gas to be spread out well when the enclosures are fed with gas from the top. In FIG. 3, the gas enters via the bottom and leaves through the top portion of the enclosure, with this corresponding to the storage stage for the second enclosure and to the return stage for the first enclosure, as explained below.

FIG. 3A is a fragmentary horizontal section in plan view on plane AA of FIG. 3. The blocks 11 of refractory material are square and they are perforated by multiple parallel circularly cylindrical holes extending in the vertical direction ZZ perpendicular to the plane of the figure. The blocks are advantageously spaced apart from one another, e.g. by a distance e=5 mm, so that the expansion of said blocks during changes of temperature can take place without damage in the thickness of the resulting interstitial space, and also enabling said space to serve, where appropriate, as a vertical channel for passing gas from the bottom of the enclosure 2 to the top thereof. The refractory material blocks 11 are advantageously in direct contact with the wall of the enclosure via the lagging 12 of said enclosure, so as to limit any direct and uncontrolled passage of cold or hot gas in said zone. In a first version of the invention, the blocks in the successive planes of blocks of refractory material are advantageously offset from one another by half a module, i.e. the blocks are staggered by half a block, so as to ensure that the assembly is stable within said enclosure, as shown in FIG. 3. In a preferred version of the enclosure, the blocks are stacked vertically on one another over the entire height of the enclosure so as to make up mutually independent stacks that are spaced apart from one another by 5 mm to 10 mm in all directions, thus making expansion during storage-return cycles while avoiding any risk of wear in the horizontal planes AA during said storage-return cycles, as occurs when they are mounted in a staggered configuration as shown in FIG. 3.

In FIG. 3B, there can be seen refractory blocks 11a of hexagonal section, close to the insulating wall of an enclosure that is of cylindrical shape. The connection with the insulating walls takes place either by direct contact with the edge of a block, or else in the form of an insulating block 12a that is adapted to the curvature, or indeed by packing with an insulating material 12a, e.g. material of the same type as the lagging 12 of said enclosure, or indeed by a refractory block 12b of shape that matches the curvature.

Branch connection valves $V_1$ to $V_4$ are provided at the junctions between:

the first top duct 1d and the first branch top duct 1d': $V_1$;

the second top duct 2d and the second branch top duct 2d: $V_2$;

the first bottom duct 1c and the first branch bottom duct 1c': $V_3$; and the second bottom duct 2c and the second branch bottom duct 2c': $V_4$.

As explained below with reference to FIGS. 1 and 2, it is possible to operate said compressor first group (first compressor 3b and first turbine 3c) on its own by disconnecting said electricity generator second group 4 during an energy storage cycle, or conversely, it is possible to disconnect said first compressor 3 and open said branch ducts to cause said second compressor 4 to operate during an energy withdrawal cycle.

The device of the invention can operate in two different modes, namely:

a first mode with storage or charging cycles; and a second mode with energy return or energy withdrawal cycles.

The energy storage or charging mode operates as follows. Initially, the inert gas, such as argon, is loaded into the device, i.e. into both enclosures, the turbines, the compressors, and the pipework. It is at ambient temperature, e.g. T=20° C.

FIG. 1 shows the device during a stage of recharging energy or storing energy in the first enclosure 1.

Initially, the entire installation is at ambient temperature T0 lying in the range 10° C. to 20° C., with the gas contained in the enclosures and the pipework thus being at said ambient temperature T0 and both enclosures are at the same initial pressure that is associated with the loading pressure, e.g. 1 bara to 1.2 bara.

The mass of refractory material inside the second enclosure 2 is then heated to a temperature T2 of 600° C. To do this, the gas of the second enclosure is caused to circulate in a closed loop between its top and bottom ends $2_1$ and $2_2$ and it is heated outside the enclosure using the first heater 5a which heat the gas in the heater pipe $5a_3$ that forms the loop between the bottom and top ends $2_2$ and $2_1$ of the second enclosure, on the outside thereof. The gas is caused to circulate through the heater pipework $5a_3$ by a fan $5a_5$, and the first heater 5a comprises a first resistance $5a_1$. A valve $5a_4$ serves to isolate the first heater 5a when it is not in use at the end of the initial preheating, thereby avoiding undesirable transfers and recirculation of gas during a normal cycle.

When the entire mass of refractory material in the second enclosure 2 has been raised to the temperature T2 of 600° C., the valve $5a_4$ is closed and the gas is sent via the second top duct 2d into the first compressor 3b so as to heat it to a temperature T1 lying in the range 1200° C. to 1400° C., e.g. 1300° C. at the outlet from said first compressor. A pressure gradient is established between the two enclosures, the first enclosure being raised to a pressure P1 of 2 bara to 4 bara ($2 \times 10^5$ Pa to $4 \times 10^5$ Pa), and the pressure P2 in the second enclosure being reduced to about 1 bara ($1 \times 10^5$ Pa).

In the first enclosure, the top portion 1a of the refractory material thus rises towards the temperature T1 of 1300° C., while the bottom portion 1b becomes established at a temperature T'1 lying in the range 20° C. to 100° C.

At the outlet from the bottom end $1_2$ of the first enclosure, the gas needs to be expanded by the first turbine 3c so as to reestablish it at the pressure P2 of the second enclosure prior to being reintroduced into the second enclosure via the bottom thereof, expanded and cooled to a temperature T3. Insofar as the energy stored by the system is associated with the temperature gradient T1-T3, it is advantageous to keep the temperature T3 as low as possible. For this purpose, it is advantageous to cause gas to be introduced and to penetrate into the first turbine $3b$ at a temperature that is as low as possible. That is why the gas is cooled from the temperature T'1 to the temperature T0 lying in the range 10° C. to 20° C. with the help of a heat exchanger 6 at the outlet from the bottom end $1_2$ of the first enclosure prior to being introduced into the first turbine $3c$.

As the various gas circulation cycles progress while operating in storage mode, the top portion $1a$ of the refractory material in the hot first enclosure at a temperature T1 of 1300° C. occupies an ever increasing volume in the enclosure, i.e. the hot gas introduced via the top end $1_1$ of the first enclosure 1 delivers heat to said refractory materials and heats an ever increasing volume of refractory material in the first enclosure. A front $1e$ that corresponds to a temperature transition zone is represented by a line in FIGS. 1 and 2. The hot top portion $1a$ at the temperature T1 and the cold bottom portion $1b$ at the temperature T'1 lying in the range 20° C. to 100° C. moves progressively downwards as the gas circulation cycles continue during storage. Conversely, the bottom portion $2b$ of the second enclosure at the temperature T3 lying in the range at least –80° C. to –20° C. occupies an ever increasing volume in the enclosure 2. The front $2e$ represents a line of separation that is constituted by a transition zone between the bottom portion $2b$ at the temperature T3 and a top portion $2a$ that the temperature T2, and it moves progressively upwards as the various gas circulation cycles progress.

The first compressor $3b$ is actuated by an electric motor $3a$ which consumes electrical energy $E_1$. The first turbine $3c$ is coupled to the first compressor $3b$ via their shafts, such that the first turbine $3c$ delivers energy to the first compressor $3b$ in addition to the energy delivered by the first motor $3a$.

During successive gas circulation cycles in energy storage mode, the temperature of the top portion $2a$ in the second enclosure tends to decrease to a temperature T'2 that is lower than T2, i.e. lower than 600° C., e.g. lying in the range 300° C. to 450° C.

To mitigate this drop in temperature of the top portion $2a$ of the second enclosure, it is advantageous to heat the gas leaving the top end $2_1$ of the second enclosure by means of a second heater $5b$ comprising a second resistance $5a_2$ that enables the gas flowing in the top duct $2d$ to be heated so as to maintain it at a temperature T2 of 600° C. before it reaches the first compressor $3b$. Similarly, the motor $3a$ is adjusted in such a manner as to maintain the outlet temperature from the first compressor $3b$ at a constant temperature T1 of about 1300° C.

Throughout the duration of the various energy storage cycles, the temperature of the gas at the inlet to the second heater $5b$ is measured and the quantity of electrical energy $E_2$ injected per second into the second heater $5b$ is adjusted in real time to raise the gas to a substantially constant temperature T2. The power injected into the installation during energy storage cycles thus corresponds to the electrical energy $E_1$ feeding the first electric motor $3a$ plus the electrical energy $E_2$ feeding the second heater $5b$.

As mentioned above, during energy storage cycles, it is necessary to cool the gas leaving the bottom end $1_2$ of the first enclosure so as to reduce its temperature to the temperature T0 prior to expanding it in the first turbine $3c$. This is done using the heat exchanger 6. The heat exchanger 6 is fed with a cooling fluid such as cold water or air at a temperature in the range 10° C. to 20° C. as to cool the gas leaving the first enclosure at the temperature T'1 lying in the range 20° C. to 100° C. and bring it to the temperature T0 lying in the range 10° C. to 20° C. The cooling fluid from the heat exchanger 6 leaves the heat exchanger 6 at $6d$ at a temperature lying in the range 50° C. to 100° C. depending on the flow rate of cooling air or water. The heat exchanger 6 thus releases heat energy $E_3$ in the form of water heated to a temperature in the range 50° C. to 100° C. This heat energy $E_3$ is energy that cannot be stored in the system, but it can be recovered either in a heat pump or it can be used in industrial processes, or even for urban heating. Thus, during a complete storage cycle, $E_3$ constitutes a loss that affects the overall efficiency of the device.

In order to stabilize the system and optimize this operation during the succession of different passages from operating in storage mode to operating in energy return mode, it is preferable to interrupt storage before the entire first enclosure has been raised to the temperature T1 or the entire second enclosure has been lowered to the temperature T3.

In practice, a bottom portion $1b$ constituting 10% to 20% of the total volume of the first enclosure is maintained in said enclosure at the temperature T'1 lying in the range 20° C. to 100° C. In parallel, a top portion $2a$ of the second enclosure is maintained at the temperature T2 or close to the temperature T2, i.e. storage is interrupted when the bottom portion $2b$ of the second enclosure at the temperature lying in the range –80° C. to –20° C. represents 80% to 90% of the volume of the second enclosure.

This volume of 10% to 20% corresponds to the volume of the temperature transition zone of height a as described below with reference to FIG. 7.

FIG. 2 shows the cycle for returning energy stored within the first enclosure 1 in the form of electrical energy Er.

Once charging of the first enclosure 1 is complete, the first motor $3a$ is stopped and the various valves $V_1$ to $V_4$ are actuated so as to feed the second group 4 with said first and second branch top ducts $1d'$, $2d'$, and said first and second branch bottom ducts $1c'$, $2c'$, the first compressor $3b$ and the first turbine $3c$ no longer being fed with gas.

Initially, at the end of the charging stage, when the first motor $3a$ is switched off, the gas becomes stationary and its pressure is brought into equilibrium in the two enclosures 1 and 2 at an intermediate value of 1.5 bara to 2.5 bara ($1.5 \times 10^5$ Pa to $2.5 \times 10^5$ Pa).

During a stage of starting the mode of operation in energy return or withdrawal cycling, a small electric motor $4d$ is activated that drives the second turbine $4c$ and the second compressor $4b$ that is coupled thereto so that a pressure gradient becomes established between the two enclosures 1 and 2, respectively with a pressure P'1 higher than P1 in the first enclosure 1 and a pressure P'2 lower than P2 in the second enclosure 2.

During starting, the second compressor sucks gas from the second enclosure and sends it to the first enclosure, thereby increasing the pressure in said first enclosure, and thus feeding the second turbine with gas so as to return finally into the second enclosure and continue its circulation cycle. As soon as the turbine reaches its operating speed, the small electric motor $4d$ is switched off.

Under steady conditions, the second turbine $4c$ sucks gas from the top portion of the first enclosure and delivers it to the second enclosure while cooling and expanding the gas. In order to optimize the operation of the installation, it is desirable for the gas leaving the second turbine $4d$ to take on substantially the same temperature T2 as the temperature of the gas in the top portion of the enclosure 2 at the end of the storage cycle. To achieve this, losses in the turbine and compressor are such that P1/P'2>P1/P2. In practice, P'1 lies in the range 3 bara to 5 bara and P'2 in the range 1 bara to 1.5 bara.

When the pressure gradient P'1/P'2 is established, the motor 4d is switched off. The gas in the bottom portion 2b of the second enclosure is at the temperature T3 lying in the range −80° C. to −20° C. which was its temperature at the end of the storage cycle. The gas is taken to the second compressor 4b where it is recompressed to the pressure P'1. It is simultaneously heated to the temperature T4, which temperature T4 is higher than the temperature T0 because of the losses in the second compressor. Typically, T4 lies in the range 100° C. to 150° C.

The gas at the temperature T4 greater than T0 at the outlet from the second compressor 4b therefore needs to be cooled to the temperature T'1 using the heat exchanger 6 prior to being delivered to the bottom end $1_2$ of the first enclosure 1, in which the bottom portion 1b is at the temperature T'1 lying in the range 20° C. to 120° C.

The cooling of the gas at the outlet from the second compressor 4b during the withdrawal cycle has the effect of causing heat energy E4 to be lost by heating the cooling liquid. However this cooling of the gas from the temperature T4 to T'1 makes it easier during energy storage cycles to cool the gas at the outlet from the bottom end $1_1$ of the first enclosure from the temperature T'1 to the temperature T0 downstream from the heat exchanger so that the gas reaches ambient temperature T0 on entering the first turbine 3c during energy storage cycles. Overall, the heat energy loss E4 during withdrawal cycles is compensated by a heat energy loss E3 in the heat exchanger 6 that is smaller than during storage cycles. The heat energies E3+E4 correspond overall to the losses from the installation associated with the gradient T4−T0 and due to losses in the compressors and the turbines.

The energy $E_R$ returned by the system corresponds to the energy released by the second turbine 4c that drives an electrical generator-alternator 4a that enables the energy to be returned in the form of electricity. Overall, $E_R$ corresponds more precisely to the energy released by the second turbine 4c minus the energy consumed by the second compressor 4b which is coupled thereto. Furthermore, the overall efficiency of the installation between the storage and withdrawal cycles can be written as follows:

$$E_R = E_1 + E_2 - (E_3 + E_4) - E_5$$

where $E_5$ represents the losses through the lagging of the enclosures, the ducts, the turbines, the compressors, and the various accessories.

The losses E3+E4+E5 represent 15% to 25% compared with the energies $E_1+E_2$ supplied, so the overall efficiency of the installation and the energy return method thus lie in the range 75% to 85%.

In order to optimize the energy efficiency of the installation, it is advantageous to avoid heating the first enclosure completely to the temperature T1 at the end of the storage cycle, so as to conserve a thermal transition layer in the bottom portion 1b at a temperature T0 or T'1, and to conserve a thermal transition zone in the top portion 2b of the second enclosure at the temperature T2. Similarly, during energy return cycles at the end of a cycle, withdrawal is stopped before the first enclosure has been cooled completely and the second enclosure has been heated completely so as to conserve a thermal transition layer in the top portion 1a corresponding to 10% to 20% of the volume of the enclosure that remains at the temperature T1, and corresponding a thermal transition zone in the bottom portion 2b of the second enclosure that remains at the temperature T3, this layer likewise representing 10% to 20% of the volume of the second enclosure.

This thermal transition zone in the top portion 2b of the second enclosure at the temperature T2 makes it easier to reestablish the pressure gradient P1/P'2 between the two enclosures at the beginning of the cycle for returning energy corresponding to the same temperatures T1/T2 in the first/second enclosures respectively.

Keeping a thermal transition zone at one end of each of the first and second enclosures at the end of a storage cycle and at the end of a return cycle is also advantageous in terms of the overall energy efficiency of the installation. If the entire first enclosure were to be heated at the end of the storage cycle, then the gas leaving the bottom end $1_1$ of the first enclosure while heating the volume corresponding to the thermal transition layer at the bottom end of the first enclosure would leave at a temperature higher than the temperature T'1, which would require greater cooling energy E3 and therefore higher energy losses.

In parallel, if at the end of the return cycle the bottom end $2_2$ of the entire second enclosure were to be heated, the gas leaving the bottom end $2_2$ of the second enclosure would leave at a temperature higher than T3 and would arrive downstream from the heat exchanger 6 at a higher temperature T4, thereby leading to higher cooling heat loss E4 and thus to energy losses that are likewise greater.

In addition, maintaining a bottom portion 1b at the temperature T'1 at the end of storage and a top portion 2a at the temperature T2 in the second enclosure at the end of storage makes it easier to start the return cycle, which requires using the motor 4d during a shorter length of time in order to establish stable operation with temperature gradients T1 and T2 in the first and second enclosures respectively at the pressures P'1 and P'2 during return. Likewise, maintaining a hot top layer 1a at the temperature T1 in the first enclosure at the end of energy return and maintaining a cold bottom layer 2b at the temperature T3 at the end of the return cycle makes it easier to start the subsequent storage cycle by reducing the amount of electrical energy E2 that is needed to maintain the gas entering the first compressor 3b at the temperature T2.

The dimensioning of the first compressor 3b and of the first turbine 3c used during storage cycles, is very different from the dimensioning of the second compressor 4b and the second turbine 4c used during withdrawal cycles given the different temperatures to which they are subjected. The volume of a gas increases with temperature, so the compressor and the turbine that operate with gas inlet at a high temperature needs to be larger in size. That is why during the storage stage, the first compressor 3b is a large compressor since it operates at a temperature T1 of 1300° C., while the first turbine 3c is a small turbine since it operates at a temperature T3 of about −50° C. Conversely, during withdrawal cycles, the second compressor 4c which operates a temperature T3 of −50° C. is a small compressor, while the second turbine 4c that operates at a temperature T1 of about 1300° C. is a large turbine. It should be observed that implementing a first turbine 3c that is small during the storage stage makes it easier for it to be driven by the large first compressor 3b. Similarly, implementing a second compressor 4b that is small reduces energy losses and the energy $E_R$ corresponds to the energy released by the second turbine 4c minus the energy consumed by the second compressor 4b. There is therefore an additional advantage in having the temperature T3 as low as possible at the inlet to the second compressor 4b so as to likewise reduce the consumption of energy that affects the overall energy consumption of the system.

Making use of cooling both during energy storage cycles and during energy withdrawal cycles downstream from the bottom end of the first enclosure during energy storage and upstream from the bottom end of the first enclosure during energy return, using the same heat exchanger, enables the size of the heat exchanger to be reduced compared with an embodiment in which, for example, the gas is not cooled during energy return cycles in a heat exchanger downstream from the bottom end of the first enclosure.

As successive gas circulation cycles take place during the energy return stage, the front 1e between the cold bottom portion 1b at T'1 and the hot top portion 1a at T1 in the first enclosure moves progressively upwards, while the front 2e between the hot top portion 2a at temperature T2 from the cold bottom portion 2b at temperature T3 in the second enclosure moves progressively downwards.

It should be observed that firstly operating the heat exchanger 6 on the gas return circuit between the second compressor 4b and the bottom portion of the first enclosure 1, and secondly operating the second turbine 4c are adjusted in such a manner as to maintain said temperatures T1 and T2 at respective constant values, e.g. of 1300° C. and 500° C., throughout the energy return cycle.

It should also be observed that, according to an essential original characteristic of the present invention, the temperatures T1 and T2 are constant and identical during energy storage/charging cycles and during energy return/discharging cycles.

Figure 4:
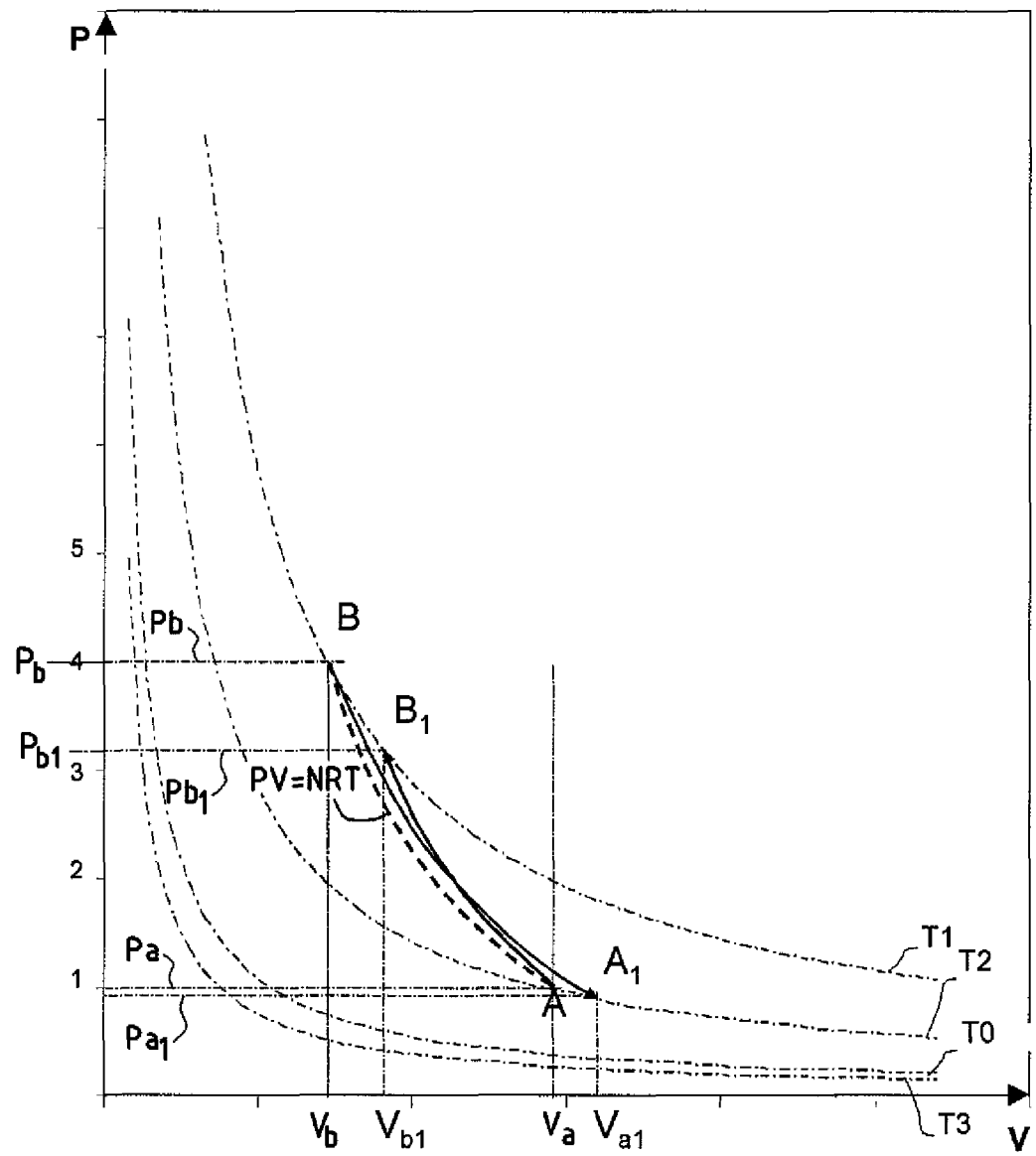
FIG. 4 shows a perfect-gas type thermodynamic cycle, and also compression and expansion of a real gas.

FIG. 4 is a graph corresponding to a thermodynamic cycle in which the abscissa axis represents volumes and the ordinate axis represents absolute pressures (bara). Four isothermals are shown corresponding respectively to:

T0 (ambient temperature 20° C.);
T1 (first enclosure temperature: 1300° C.);
T2 (hot second enclosure temperature: 600° C.); and
T3 (cold second enclosure temperature: −80° C. to −20° C.)

Between points A and B, there is represented an adiabatic compression/expansion cycle for a perfect gas in application of the relationship: $PV^\gamma$=constant, between the temperatures T1 and T2. In a real machine, the behavior is different, and for adiabatic compression between T2 and T1, the curve actually followed is AB1, which shows that the temperature T1 is reached at a pressure Pb1 that is lower than Pb and at a volume Vb1 that is greater than Vb. Similarly, during adiabatic expansion, the temperature T2 is reached for a pressure Pa1 that is lower than Pa and a volume Va1 that is greater than Va.

It should be observed that for effective management of heat in both of the enclosures, it is important for the high portion of each of the gas enclosures to be at respective temperatures that are substantially identical during the storage stage and during the return stage. To explain this point, consider for example the top portion of the first enclosure. During the storage stage, the hot gas penetrates from the top into the supply of refractories. The temperature of the solids cannot exceed that of the gas but can merely come as close as possible thereto. During the return stage, the temperature of the gas leaving the top portion of the supply of refractory material in the first enclosure can at best be equal to the temperature of said refractory material. Identical remarks can be made for the second enclosure. In order to obtain the highest possible efficiency, it is important in the first enclosure for all of the heat of the gas that is injected during the storage stage to be used as well as possible during the return stage, and in the second enclosure for all of the heat recovered from the gas during the storage stage to be reused as well as possible during the return stage. In other words, it is advantageous to seek to have temperatures T1 and T2 that are as close together as possible (ideally identical) during the storage and return stages.

As mentioned above with reference to FIG. 4, if the same temperatures T1 and T2 are used during expansion or compression with real machines, then the pressure ratios are different. This means that the pressure ratios of the turbine-and-compressor assemblies used during the storage and return stages need to be different. For example, from FIG. 4, during storage the high pressure is $P_{b1}$ and the low pressure $P_a$, whereas during the return stage the high pressure is $P_b$ and the low pressure $P_{a1}$.

Figure 5:
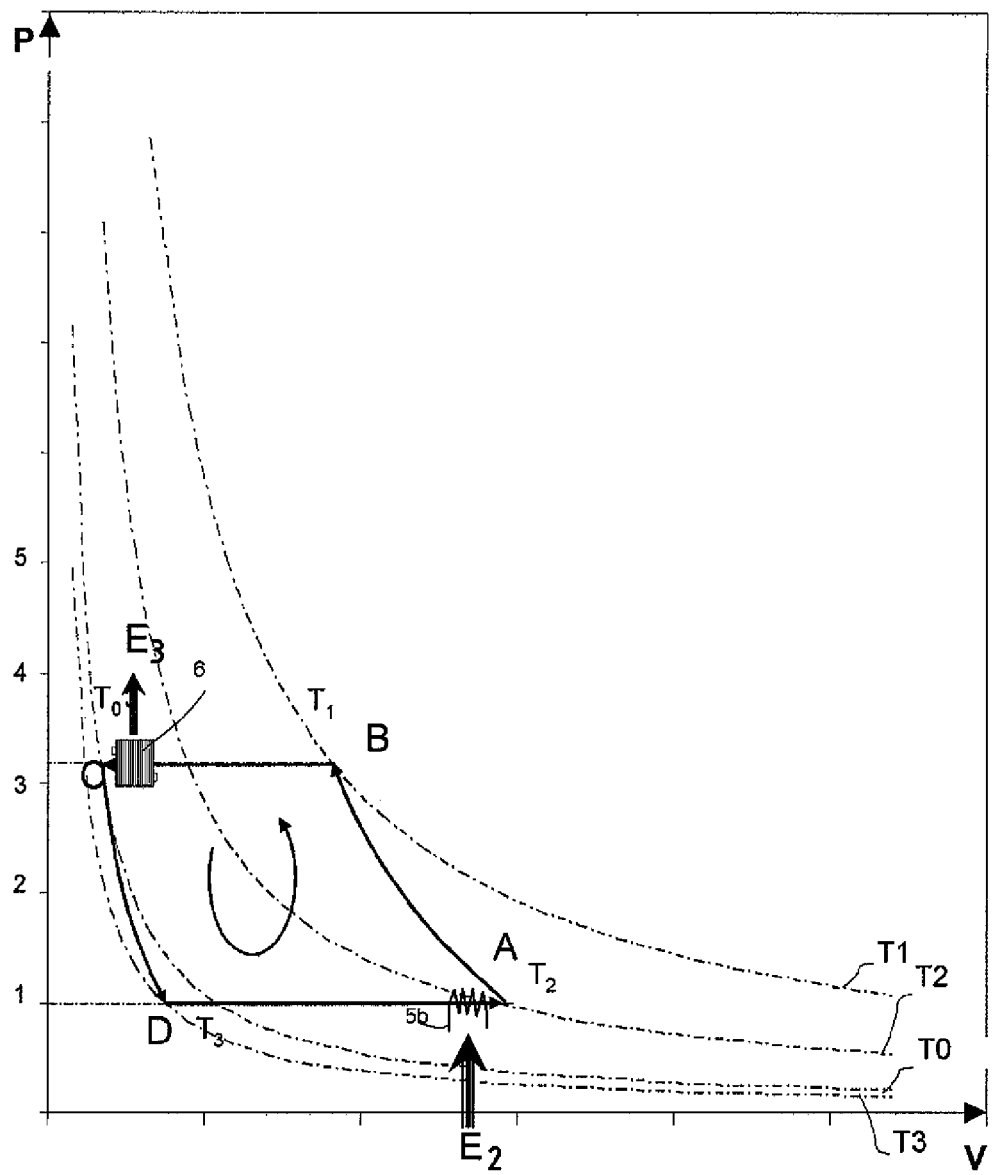
FIG. 5 shows the thermodynamic cycle for recharging the first enclosure from electrical energy taken from the network.
Figure 6:
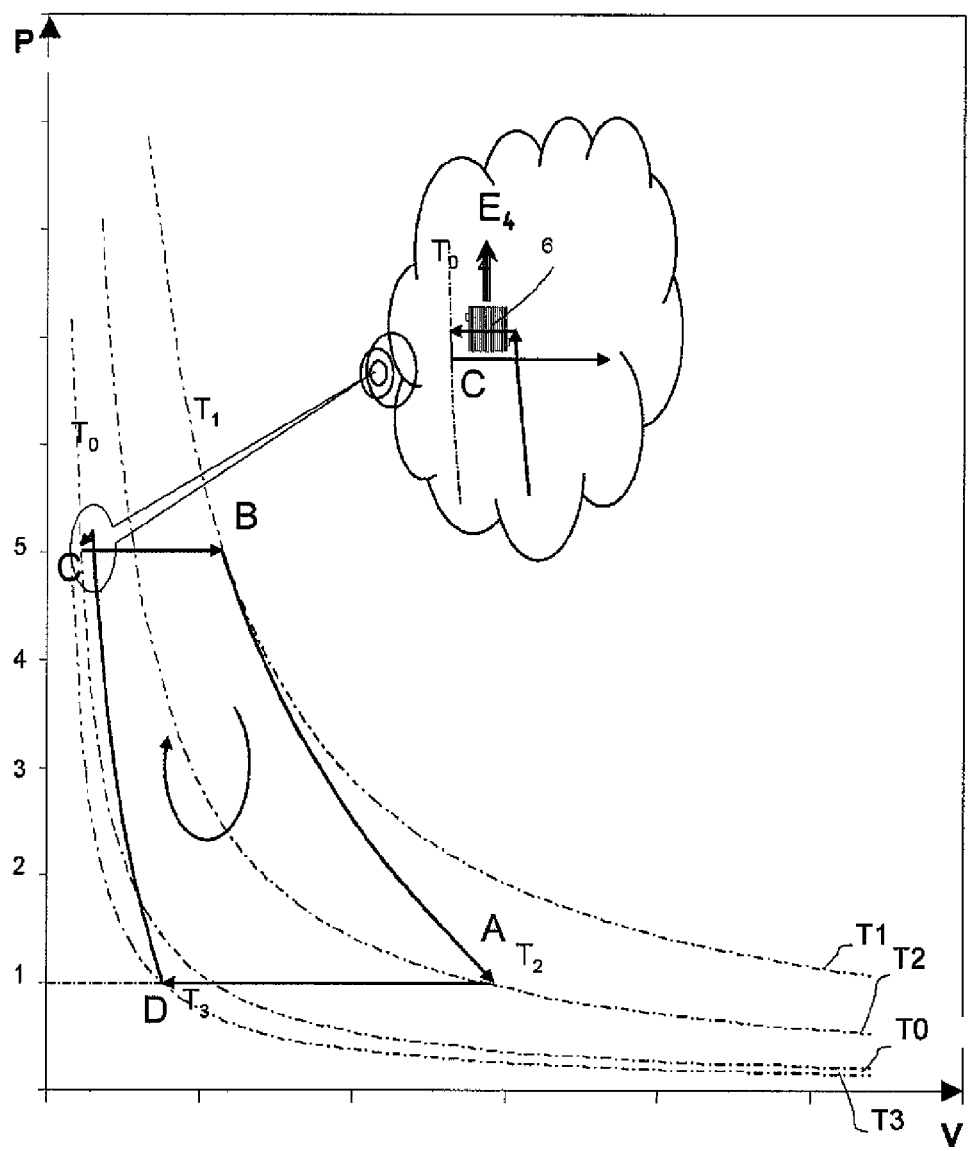
FIG. 6 shows the thermodynamic cycle for returning energy from the first enclosure for the purpose of being re-injected into the network.

FIGS. 5 and 6 show thermodynamic cycles corresponding respectively to the energy storage and return cycles that take place in the installations and methods as described with reference to FIGS. 1 and 2. These thermodynamic cycles correspond to a unit volume of gas, e.g. 1 m³, performing one complete cycle during which it acquires energy in one of the enclosures or in a compressor, and then returns it in a turbine or in the other enclosure. Said unit volume performs this thermodynamic cycle in a length of time that is very short compared with the complete duration of a storage or return cycle, and it thus carries out hundreds or thousands or even tens of thousands of thermodynamic cycles, i.e. it passes that many times through the compressor, the turbine, the ducts, and each of the enclosures.

FIG. 5 shows the storage stage as described with reference to FIG. 1. The gas coming from the top portion of the second enclosure enters the first compressor 3b at the temperature T2 at point A. It is compressed and leaves at the temperature T1 at point B. It penetrates the refractory mass 11 of the first enclosure 1, passes through the refractory mass delivering heat thereto, thereby causing the temperature front to move progressively downwards. The gas leaves the bottom portion of the first enclosure at 6a at a temperature of about 20° C. to 100° C., and then passes through the heat exchanger 6 where it delivers energy E3 to the outside so as to leave said heat exchanger at a substantially constant temperature T0 corresponding to an ambient temperature of 20° C., corresponding to point C of the diagram. It then passes through the turbine at 3c where it gives off its energy to the compressor 3b, and it leaves the turbine in the pipe 2c at the temperature T3 (−50° C.) corresponding to point D of the diagram. Finally, it enters the low portion of the second enclosure, where it recovers heat from the refractory mass through which it flows upwards, thereby causing the temperature front E2 to rise progressively upwards. Finally, the gas leaves the second enclosure from the top thereof and is taken to the compressor 3b, which it enters at the temperature T2, possibly after passing through the heater 5b where, if necessary, it receives sufficient energy E2 to readjust said gas temperature to a value T2. The gas is then returned to point A on the diagram and then undertakes a new cycle.

The thermodynamic cycle for returning energy as shown in detail on FIG. 6 takes place as follows. The gas at high temperature T1 leaves the first enclosure 1 from the top, corresponding to point B on the diagram. The gas is then passed through the turbine 4c to where it delivers energy to the generator (ER) and reaches point A on the diagram at temperature T2. Thereafter it enters the top of the second enclosure and delivers its heat to the refractory mass 11, thereby causing the temperature front 2e to move progressively downwards, and it leaves said enclosure from the bottom at a temperature T3 corresponding to point D on the diagram. The gas then passes through the second compressor 4b which it leaves at a temperature T4 higher than the desired temperature T0: it then passes through a heat exchanger 6 where it delivers the quantity of energy E4 to the outside, so as to return to the temperature T0, and thus to point C of said diagram. Finally, it penetrates into the first enclosure from the bottom where it recovers energy and heats up to reach point B of the diagram, thereby causing the temperature front 1e to rise progressively upwards, in other words cooling said first enclosure down overall.

FIG. 7 shows on the left, in section in side view, the first enclosure and the rising front 1e between the bottom zone where the temperature is about 20° C. and the top portion where the temperature is about 1300° C. This rising front corresponds to a transition zone of height h as shown in greater detail by the graph on the right of FIG. 7. During the energy storage stage, the transition zone moves downwards (FIG. 7B), and during the return stage it moves upwards (FIG. 7A). In order to remain within the operating ranges of the turbine machines that corresponds to best efficiency, the first enclosure is advantageously neither fully charged nor fully discharged, which corresponds, as shown in detail in FIG. 7B, to limiting the charge/discharge cycle to a maximum height $\delta H_1$, e.g. corresponding to 80%-90% to the total height, and thus of the total peak capacity of said first enclosure. In like manner, a similar transition zone exists in the second enclosure, however it corresponds to different temperatures, e.g. −50° C. in the bottom portion and 500° C. in the top portion. The percentage of the calorific mass that is used then corresponds to a height $\delta H_2$, said used percentage preferably being substantially identical to that to of said first enclosure, i.e. 80%-90%.

By means of this configuration having two enclosures at different temperatures, with masses of refractory material that are used to only 80%-90% of their heat capacity, it is possible to obtain efficiency that is very good, of the order of 75% to 85%.

This is due firstly to the fact that the energy is alternately pumped and recovered between two temperature levels T2 to T1 that are both well above ambient temperature. It is known from Carnot's theorem that the efficiency of a heat engine increases with increasing temperature of its hot source.

A second reason lies in the temperatures T1 and T2 being equal during both the storage and the return stages, with this being obtained by using different turbine and compressor assemblies operating with different pressure ratios (P1/P2 and P'1/P'2).

A third reason for the good overall efficiency lies in the fact that during the storage stage, losses from the hot compressor 3b are extracted in the form of heat in the gas. This energy is stored in the refractory of the first enclosure 1 just like the heat pumped from the second enclosure. This loss of energy from the hot compressor is thus recovered for the most part in the form of useful work during the return stage.

The fourth reason results from using regenerators for exchanging heat with a gas. It is possible to arrange sets of refractory parts that can operate at very high temperature and that present a very large heat exchange area between the gas and the solids. This makes it possible to approach as close as possible to equality between the temperatures T1 and T2 in both stages. The storage capacity is associated with the mass of refractory material. The disposition of the invention presents the advantage that nearly all of the refractory mass is used to perform two roles: storing heat and exchanging heat with the gas.

The final reason for good overall efficiency results from the fact that the cold produced by expansion in the turbine 3c during the storage stage is likewise stored in the enclosure 2. During the return stage this enables the gas to be cooled prior to it being compressed by the compressor 4b, thereby decreasing the amount of energy absorbed by the compressor 4b, which energy is taken from the energy that is returned $E_R$.

The power of a turbomachine is given by the formula:

$$W = m \cdot Cp \cdot (T2 - T1)$$

where: m is the mass flow rate of the gas in kilograms per second (kg/s), Cp is the heat capacity of the gas in joules per kilogram per kelvin (J/kg/K), T1 is the gas inlet temperature and T2 is the gas outlet temperature. For a turbine, T2<T1 and W is therefore negative (power is extracted from the gas). For a compressor, W is positive (power is delivered to the gas).

The density of the gas is proportional to its molar mass. It is easier to compress or expand a heavy gas than a light gas. The necessary machines are smaller and less expensive for a heavy gas than for a light gas.

The molar mass of argon is 40, of $CO_2$ is 44, of krypton is 84, of xenon is 131, and of radon is 222.

Thus, a turbomachine using krypton or xenon as its gas is much more compact than one using a gas such as helium that has a molar mass of 4, or nitrogen that has a molar mass of 28. In addition, in the thermodynamic formula:

$$PV^\gamma = \text{constant}$$

γ=1.66 for a monatomic gas;
γ=1.4 for a diatomic gas; and
γ=1.33 for a triatomic gas.

The temperature ratios T1, T2 depends on the pressure ratio P1, P2 or P'1, P'2, in application of the formula:

$$\frac{T1}{T2} = \left(\frac{P1}{P2}\right)^{\frac{\gamma-1}{\gamma}}$$

It can be seen that for a given temperature ratio, the pressure ratio is smaller for a monatomic gas (γ=1.66) than for a diatomic gas (γ=1.4), or a triatomic gas (γ=1.33). This is of practical advantage in the design of the enclosures. The wall thickness of the enclosures is associated with the maximum pressure of the gas. In addition, since the method has the capacity to store very large quantities of energy it would use enclosures of very large dimensions. It is therefore economically advantageous to seek to minimize the internal pressure level of the gas. One simple way of achieving this result is to limit the compression ratio of the gas, for which it is preferable to select a gas that is monatomic.

Thus, the best cycle is obtained with a monatomic gas, such as helium, neon, argon, or other noble gases of high molecular mass.

Diatomic gases such as nitrogen and triatomic gases such as air or $CO_2$ are very abundant and inexpensive, but at high temperature they are aggressive to metals constituting the casing of enclosures, the pipes, or the blades of turbines and compressors, that is why it is advantageous for the gas within the device to be an inert gas that is completely inert relative to the metal elements of the device, such as helium, neon, argon or other noble gases of higher molar mass. Helium, neon, and argon are present at significant percentages in ambient air and they are available in large quantities at acceptable costs. Of these three gases, argon is the gas that gives the best performance for use in the device of the invention since it is monatomic, inert at high and very high temperatures relative to metal elements constituting the device of the invention, and it presents a molecular mass that is high together with an acquisition cost that is low.

Said first refractory material of the first enclosure is for example chamotte, also known as second-firing fire clay that withstands 1200° C., or indeed a composition having a high content of alumina and/or magnesia. The second refractory material in the second enclosure may be first-firing fire clay.

As mentioned above, the refractory materials 11 are in the form of bricks that are perforated by parallel channels having a diameter of 5 mm to 20 mm and that pass right through the bricks, being disposed in such a manner as to enable gas to circulate and pass along the channels in the longitudinal direction of the enclosure.

Various types of very high temperature refractory material that are available under economically acceptable conditions are listed in the table below.

| Material | Composition | Limit T | Density kg×m$^{-3}$ | Heat capacity (J * g$^{-1}$ * K$^{-1}$) | Heat capacity (kJ * m$^{-3}$ * K$^{-1}$) |
|---|---|---|---|---|---|
| Chamotte | Fire clay (35% Al$_2$O$_3$) | 1250° C. | 2000 | 1000 | 2000 |
| Magnesia | MgO | 1800° C. | 3000 | 1200 | 3600 |
| Dolomite | CaO—MgO | 1800° C. | 2700 | 1100 | 2970 |
| Mullite | 70% Al$_2$O$_3$ | 1700° C. | 2600 | 1088 | 2830 |
| Carbon | C | 2200° C. | 2200 | 1300 | 2860 |

Chamotte remains the least expensive of all these materials, but its maximum temperature remains well below that of the others.

Furthermore, the energy stored in a cubic meter of refractory is given by the formula:

$$E = V \cdot Cp(T - T0)$$

where E is expressed in joules, V is the volume of hot refractory, Cp is the heat capacity in joules per cubic meter per kelvin (J/m$^3$/K), T is the hot temperature, and T0 is the initial temperature before heating.

It can thus be seen that the higher the storage temperature T the greater the amount of energy that is stored per unit volume of refractory.

Thus, for magnesia the limit temperature of 1800° C. presents better performance in terms of heat capacity per unit volume with a value:

$$Cp = 3600 \text{ kJ} * \text{cm}^{-3} * \text{K}^{-1}$$

By way of example, for a device having a capacity of 3000 MWh, capable of storing and returning power at 100 MW, corresponding to charging over 40 hours and return over 30 hours is constituted:

by a first enclosure that is cylindrical having a diameter of 41 meters (m) and a height of 20 m, containing 16,500 m$^3$ of magnesia, presenting 25% porosity, i.e., 37,000 metric tonnes (t) of refractory material; and a second enclosure having a diameter of 48 m, a height of 20 m, and containing 22,500 m$^3$ of chamotte, presenting 35% porosity, i.e. 29,500 t of refractory material, a storage group comprising a 100 MW electric motor 3a, a 117 MW compressor 3b, a 17 MW turbine 3c, and a return group comprising a 100 MW generator 4a, a 156 MW turbine 4c, and a 56 MW compressor 4b. The internal volume of the complete installation, including the connection ducts, but excluding the volume corresponding to the effective mass of refractory, comes to about 35,000 m$^3$. A fraction of the gas is confined within the insulating materials that lag the walls of the hot refractory enclosures (about 12,000 m$^3$) and only an available volume of 23,000 m$^3$ can participate in gas circulation. The installation is filled with argon prior to starting a pressure of 1 bar, i.e. 2 bara, which corresponds to a volume of 70,000 normalized cubic meters (Nm$^3$), of which 46,000 Nm$^3$ is free to circulate. During the storage stage, the pressure P1 is 3 bara in the first enclosure and the pressure P2 is 0.9 bara in the second enclosure, whereas during discharging, these pressures are respectively 3.3 bara (P'1) and 0.6 bara (P'2). The temperature T1 becomes established at 1256° C. while the temperature T2 is about 600° C. During the storage stage, the flow rate of gas to the turbine 3c or the compressor 3b is 193 normalized cubic meters per second (Nm$^3$/s), giving a thermodynamic cycle time as shown in FIG. 5 of 238 seconds, which corresponds to 600 cycles of gas circulation for the duration of a full charge. Similar values are obtained for the discharge cycle.

Centrifugal or axial compressors and turbines are generally limited in temperature because of the aggressivity of the gas that results from combustion, however in the device of the invention, said turbines and said compressors are used in a closed circuit with an inert gas such as argon, thereby enabling such machines to present operating points at much higher temperature than in the prior art.

The energy stored in the first and second enclosures is not lost unless the device is left inactive for a long time in terms of charging-discharging, and losses then take place to the surrounding medium, principally through the lagging 12 of said enclosures.

Since the method is essentially of advantage in storing large quantities of energy, the enclosures are relatively voluminous, which means that their surface over volume ratio is small. Heat losses for large enclosures represent only a small fraction of the energy stored. Thermal insulation is achieved with materials presenting high porosity, such as ceramic fiber felts or ceramic foams. Calculation shows that in the above-cited example, lagging presenting a thickness of 2 m using conventional fiber materials enables energy losses to be limited to less than 1% per day.

Since the gas is inert, the large compressor 3b and the large turbine 4c that operate at high temperature can advantageously be made with carbon-based materials. Such materials are capable mechanically of withstanding very high temperatures, up to more than 2000° C. They are not usually used for constructing turbomachines since they oxidize rapidly in oxidizing gases such as air or combustion products. This limitation does not apply here, so the use of carbon-based materials can be envisaged. Carbon turbines have already been made experimentally, or for rocket engines having a lifetime of no more than a few minutes. In this application of the invention, such turbines or compressors would have no lifetime limitation. In current machines made using metals, it is necessary to cool the blades by an internal flow of cold gas, and this is achieved to the detriment of efficiency. In spite of that, the moving blades present a lifetime that is limited because of the phenomenon of creep.

FIG. 1 shows two separate heaters 5a and 5b, however it is possible to use a single heater, providing the configuration of the ducts is adapted appropriately.

The invention claimed is:

1. An installation for storing and returning electrical energy, wherein the installation comprises:
   first and second enclosures containing a gas and first and second porous refractory materials capable of transferring heat by contact between said porous refractory materials and a gas flowing through said enclosures;
   a closed circuit of pipes enabling a gas to pass successively through each of the two enclosures from one end to the other;

a compressor and an expander for compressing and expanding, respectively, the gas flowing in said pipes between each of the ends of an enclosure connected to an end of the other enclosure, said compressor comprises a first gas compressor and a second gas compressor, and said expander comprises a first gas expander and a second gas expander;

a first gas heater suitable for heating the gas flowing in said second enclosure; and a cooler for cooling the gas flowing between one of the ends of the first enclosure and said compressor and expander, capable of cooling the gas leaving said first enclosure at said end prior to being expanded in said expander, or respectively the gas entering into said first enclosure after being compressed by said compressor.

2. The installation for storing and returning energy according to claim 1, comprising:

A) a first lagged enclosure filled with a first porous refractory material capable of passing a gas flowing through said first enclosure between top and bottom ends of said first enclosure;

B) a second lagged enclosure filled with a second porous refractory material capable of passing a gas flowing through said second enclosure between top and bottom ends of said second enclosure;

C) lagged pipes enabling the gas to flow in a closed circuit between the two enclosures, the pipes comprising at least one first top pipe and at least one second top pipe between the top ends of the two enclosures, and at least one first bottom pipe and at least one second bottom pipe between the bottom ends of the two enclosures;

D) said first gas heater suitable for heating a gas inside said second enclosure;

E) said first gas compressor comprising an electric motor suitable for being fed with electrical energy for storing to actuate a first compressor capable of compressing a gas coming from said top end of the second enclosure via said second top pipe to deliver it to said top end of the first enclosure via said first top pipe;

F) said first gas expander comprising a first turbine capable of expanding the gas coming from said bottom end of the first enclosure via said first bottom pipe to deliver it to said bottom end of the second enclosure via said second bottom pipe;

G) said second gas compressor capable of compressing the gas coming from said bottom end of the second enclosure via another second bottom pipe to deliver it to said bottom end of the first enclosure via another first bottom pipe;

H) said second gas expander comprising a second turbine capable of expanding the gas coming from said top end of the first enclosure via another first top pipe to deliver it to said top end of the second enclosure via another second top pipe, said second expander being suitable for actuating an electricity generator suitable for returning the electrical energy; and I) said gas cooler capable of cooling the gas flowing in said first bottom pipe between firstly the bottom end of the first enclosure and secondly the outlet and inlet of said second compressor and said first turbine, respectively.

3. The installation for storing and returning energy according to claim 2, including second gas heater capable of heating the gas flowing in a said second top pipe between the top end of said second enclosure and said first gas compressor.

4. The installation for storing and returning energy according to claim 2, wherein said first turbine is suitable for being actuated by said first compressor to which it is mechanically coupled.

5. The installation for storing and returning energy according to claim 2, wherein said second turbine is coupled to an auxiliary electric motor capable of driving said second turbine.

6. The installation for storing and returning energy according to claim 2, wherein said second gas compressor is actuated by said second turbine to which it is mechanically coupled.

7. The installation for storing and returning energy according to claim 2, wherein said first enclosure and the first porous refractory material are capable of withstanding a temperature $T1$ of at least 750° C. and said second turbine is dimensioned to expand a gas at said temperature $T1$, while said first turbine, of smaller capacity than the second turbine, is dimensioned to expand the gas from ambient temperature $T0$ to a temperature $T3$ in the range $-80°$ C. to $-20°$ C.

8. The installation for storing and returning energy according to claim 2, wherein said second enclosure and second porous refractory material are capable of withstanding a temperature $T2$ of at least 400° C. and said first gas compressor is dimensioned to compress a gas at said temperature $T2$, while said second gas compressor, of smaller capacity than the first compressor, is dimensioned to compress the gas at a temperature $T3$ in the range $-80°$ C. to $-20°$ C. to ambient temperature.

9. The installation for storing and returning energy according to claim 2, wherein said first gas compressor is capable of delivering at a volume flow rate greater than said first turbine, and said second turbine is suitable for delivering a volume flow rate greater than said second gas compressor, and said first compressor and second turbine are made of carbon.

10. A method of storing electrical energy in the form of heat energy, in which an installation according to claim 2 is used, wherein, after an initial step of preheating the gas of said second enclosure that is heated to a temperature $T2$, said installation being filled with a permanent gas that is initially at ambient temperature $T0$, the following successive steps are performed:

1) the gas leaving the top end of the second enclosure at a temperature $T2$ is heated to a temperature $T1$ higher than a temperature $T2$ by being compressed in a said first compressor before being delivered to the top end of said first enclosure, in which a pressure $P1$ is established higher than the pressure $P2$ of the second enclosure, said first compressor being driven by a first electric motor powered by the electrical energy that is to be stored;

2) the gas passes right through said first enclosure between said top end and its said bottom end of the first enclosure, and it leaves said bottom end of the first enclosure at an ambient temperature $T0$ or a temperature $T'1$ greater than $T0$ but less than $T2$;

3) the gas is then cooled, where appropriate, to an ambient temperature $T0$ by said gas cooler located downstream from the outlet of the bottom end of the first enclosure;

4) the gas is then expanded through said first turbine driven by said first compressor, to said pressure $P2$ of the second enclosure that is lower than the pressure $P1$, the gas thus being cooled to a temperature $T3$ lower than $T0$ prior to entering into said second enclosure via the bottom end of said second enclosure;

5) the gas is caused to flow through said second enclosure between said bottom end of the second enclosure and said top end of the second enclosure, thereby having the effect of increasing the volume of the refractory material in the bottom portion of said second enclosure that is cooled to the temperature T3, and of decreasing the volume of the top portion of the second enclosure that is at the temperature T2 or T'2 lower than T2 but greater than T0 and T'1, the gas leaving the second enclosure at the temperature T'2 is heated to the temperature T2 with the help of said second gas heater; and 6) above steps 1) to 5) are repeated until the top portion of the first enclosure heated to the temperature T1 occupies at least 80% of the volume of said first enclosure, and the bottom portion of the second enclosure cools to a temperature T3 occupying at least 80% of the volume of the second enclosure.

11. The method according to claim 10, wherein, in step 6), storage is interrupted so that the bottom portion of the first enclosure at said temperature T'1 represents at least one of 10% of the volume of the first enclosure and the top portion of the second enclosure at the temperature represents less than 20% of the volume of said second enclosure.

12. The method according to claim 10, wherein said temperatures T1 and T2 are such that T1/T2=1.5 to 3 and T1/T0 is greater than 2 and P1/P2 lies in the range 2 to 4.

13. The method according to claim 12, wherein the pressure P1 lies in the range 2 to 4 bars absolute, and the pressure P2 lies in the range 0.5 to 1.5 bars absolute.

14. The method according to claim 10, wherein T1 is 750° C. to 2000° C. and T2 is 400° C. to 1000° C.

15. The method according to claim 10, wherein T0 lies in the range 10° C. to 50° C., T3 lies in the range −80° C. to −20° C., and T1' lies in the range 20° C. to 150° C.

16. The method according to claim 10, wherein the quantity of electrical energy stored lies in the range 20 MWh to 10,000 MWh.

17. The method of returning electrical energy from heat energy stored by a method according to claim 10, wherein, after an initial starting stage in which said second compressor and said second turbine are driven by the said auxiliary electric motor, during which initial stage a pressure gradient is established between the pressure P'1 in the first enclosure and a pressure P'2 less than P'1 in the second enclosure, such that P'1 is greater than P'2, the following successive steps are performed:

1) the gas leaving via the top end of the first enclosure at said temperature T1 is expanded and cooled to the temperature T2 through the second turbine, and said second turbine actuates a electricity generator enabling returned electrical energy to be delivered;

2) the gas passes through said second enclosure from its top end to its bottom end, a top portion of the second enclosure being heated to said temperature T2, a bottom portion of the second enclosure remaining at said temperature T3;

3) the gas leaving the bottom end of said second enclosure at the temperature T3 is then compressed by passing through said second gas compressor that is actuated by the energy released by the second turbine so as to be heated to a temperature T4 greater than an ambient temperature T0 but less than T2, at the outlet from said second compressor;

4) the gas is then cooled to the ambient temperature T0 or T'1 by said cooler means prior to being introduced into said first enclosure by its bottom end to enter the bottom portion of said first enclosure which is at said temperature T'1; and 5) the gas is caused to flow through said first enclosure, thereby having the effect of increasing the volume of refractory material in the bottom portion that is at said temperature T'1 and of decreasing the volume of refractory material in the top portion that is at said hot temperature T1; and 6) above steps 1) to 5) are repeated until the bottom portion of the first enclosure at said temperature represents at least 80% of the volume of the first enclosure, and the top portion of said second enclosure at said temperature represents at least 80% of the volume of said second enclosure.

18. The method according to claim 17, wherein, in step 6), the energy return method is interrupted so as to maintain a top portion of the first enclosure at a said temperature T1, said top portion representing less than 20% of the volume of said first enclosure, and a bottom portion of the second enclosure at said cold temperature T3 represents less than 20% of the volume of the second enclosure.

19. The method according to claim 17, wherein the efficiency ER/E1 with which electrical energy is returned by said electricity generator is greater than 60%.

20. The method according to claim 17, wherein the ratio P'1/P'2 lies in the range 3 to 5.

21. The method according to claim 17, wherein T4 lies in the range 150° C. to 400° C.

22. The method according to claim 17, wherein the pressure P'1 lies in the range 3 to 5 bars absolute and P'2 lies in the range 1 to 1.5 bars absolute.

23. The installation for storing and returning energy according to claim 1, that is filled with an inert gas.

24. An installation for storing and returning energy according to claim 1, wherein said first and second porous refractory materials exhibit porosities lying in the range 20% to 60%.

25. The installation for storing and returning energy according to claim 24, wherein said first and second porous refractory materials are constituted by porous bricks assembled one against another, said bricks having cylindrical perforations passing therethrough that are disposed parallel in a common longitudinal direction that is the longitudinal direction of the enclosure in which they are assembled.

26. The installation for storing and returning energy according to claim 1, wherein said first and second porous refractory materials are constituted by fire clay comprising compounds selected from magnesia, alumina, and lime.

27. The installation for storing and returning energy according to claim 1, wherein said first porous refractory material is constituted by second-firing fire clay or chamotte.

28. The installation for storing and returning energy according to claim 1, wherein said second porous refractory material is constituted by first-firing fire clay.

29. The installation for storing and returning energy according to claim 1, wherein said first and second enclosures have respective volumes of not less than 5000 m³.

* * * * *